(12) United States Patent
Takaoka et al.

(10) Patent No.: US 12,192,429 B2
(45) Date of Patent: Jan. 7, 2025

(54) COMMUNICATION APPARATUS HAVING FIRST AND SECOND SETTING INFORMATION, CONTROL METHOD, AND STORAGE MEDIUM FOR STORING PROGRAM

(71) Applicant: CANON KABUSHIKI KAISHA, Tokyo (JP)

(72) Inventors: Kohei Takaoka, Kanagawa (JP); Aran Kunimatsu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/581,795

(22) Filed: Feb. 20, 2024

(65) Prior Publication Data

US 2024/0195927 A1   Jun. 13, 2024

Related U.S. Application Data

(63) Continuation of application No. 18/132,461, filed on Apr. 10, 2023, now Pat. No. 11,936,831.

(30) Foreign Application Priority Data

Apr. 18, 2022   (JP) ................. 2022-068469

(51) Int. Cl.
*H04N 1/327*   (2006.01)
*H04W 12/06*   (2021.01)

(52) U.S. Cl.
CPC ........ *H04N 1/32704* (2013.01); *H04W 12/06* (2013.01); *H04N 2201/0041* (2013.01)

(58) Field of Classification Search
None
See application file for complete search history.

(56) References Cited

U.S. PATENT DOCUMENTS

2018/0263069 A1 *   9/2018   Numakami ............. H04W 4/70

FOREIGN PATENT DOCUMENTS

JP         2007052740 A  *  3/2007

* cited by examiner

*Primary Examiner* — Andrew H Lam
(74) *Attorney, Agent, or Firm* — VENABLE LLP

(57) ABSTRACT

A communication apparatus capable of communicating with an access point includes a memory containing instructions and a processor for executing the instructions to function as a storage unit configured to store, in at least one memory, each of first setting information, which can be changed by a first user and cannot be changed by a second user whose authorization is lower than that of the first user, and second setting information, which can be changed by the second user. The communication apparatus is operated using the first setting information when a predetermined authentication method is used in communication in which connection in which connection between the access point and the communication apparatus is established is used, and the communication apparatus is operated using the second setting information when the predetermined authentication method is not used.

18 Claims, 20 Drawing Sheets

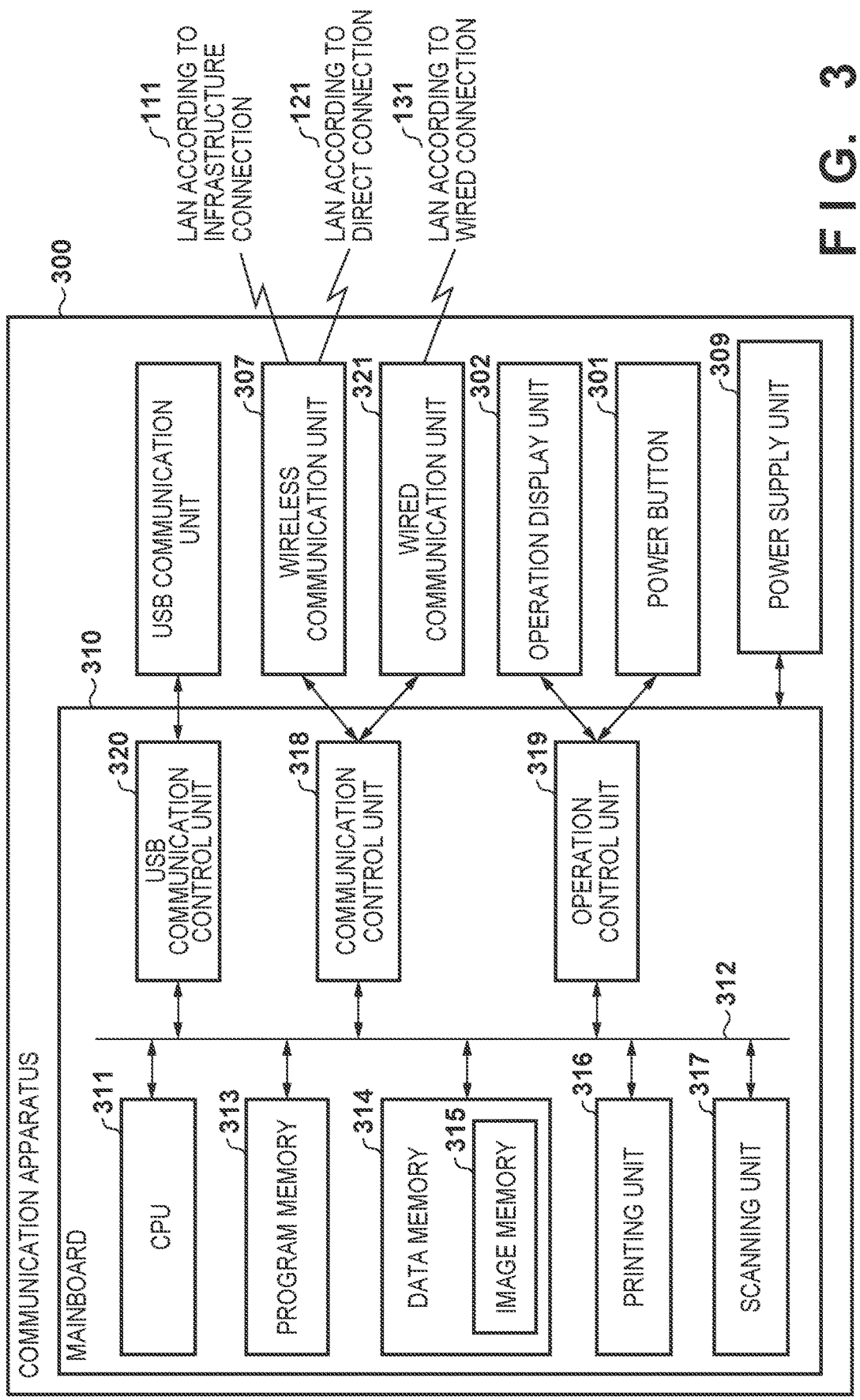

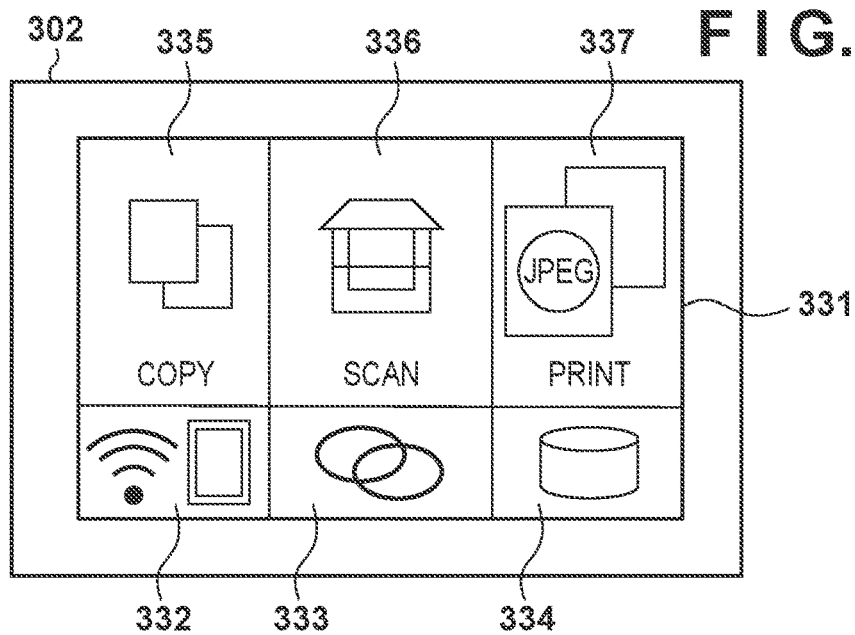
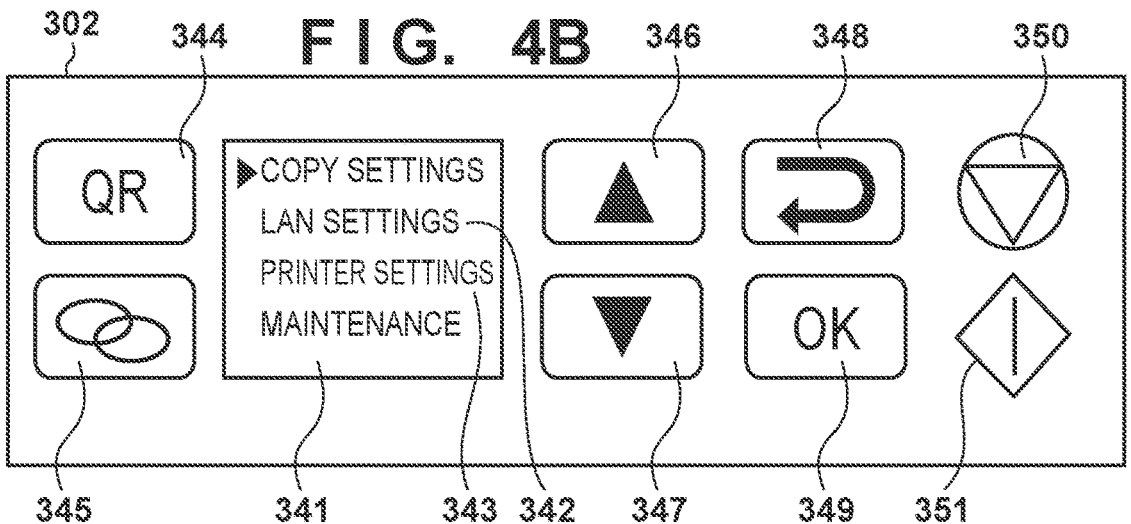
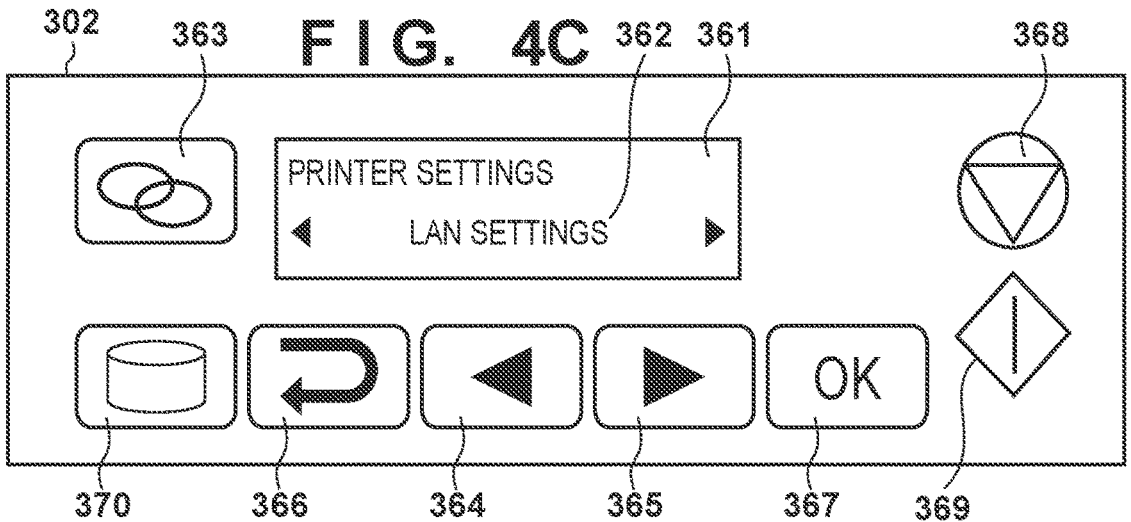

LAN ACCORDING TO INFRASTRUCTURE CONNECTION IN WHICH AUTHENTICATION METHOD IS THAT IN WHICH AUTHENTICATION SERVER IS USED

LAN ACCORDING TO INFRASTRUCTURE CONNECTION IN WHICH AUTHENTICATION METHOD IS THAT IN WHICH AUTHENTICATION SERVER IS NOT USED

LAN ACCORDING TO DIRECT CONNECTION

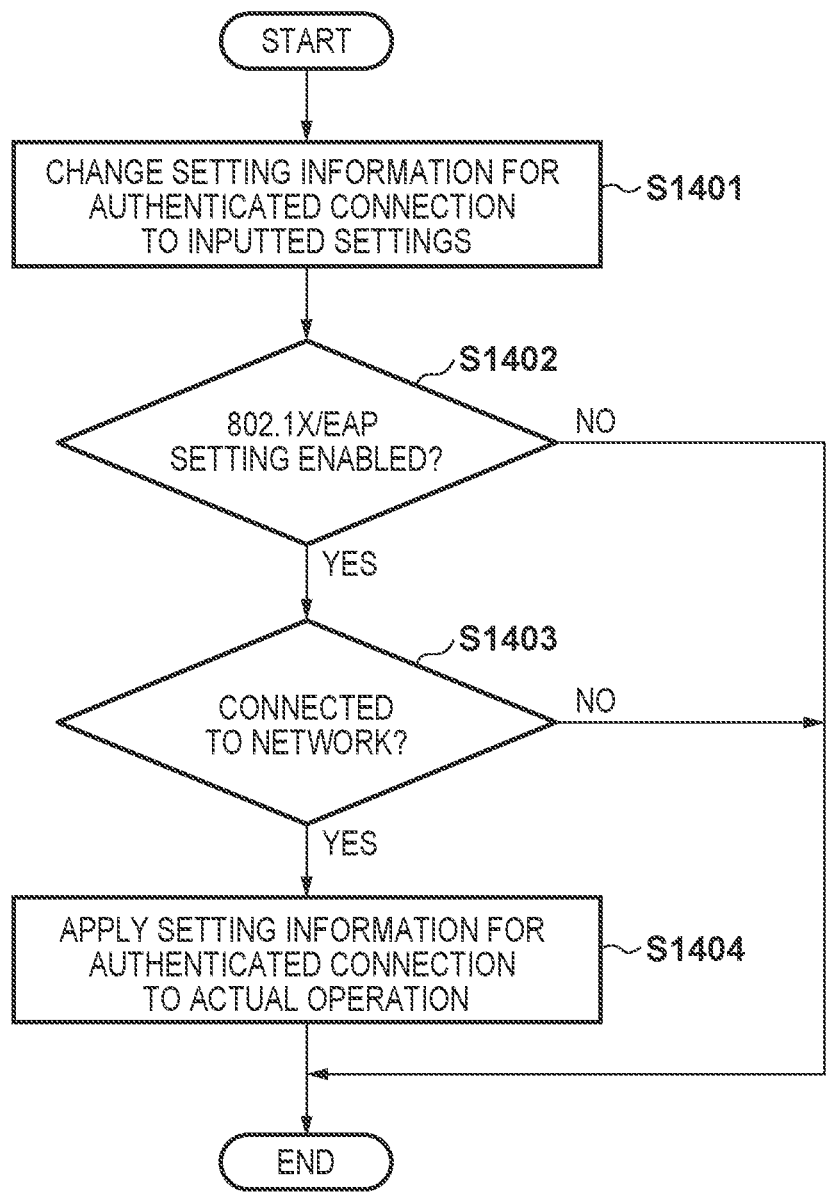

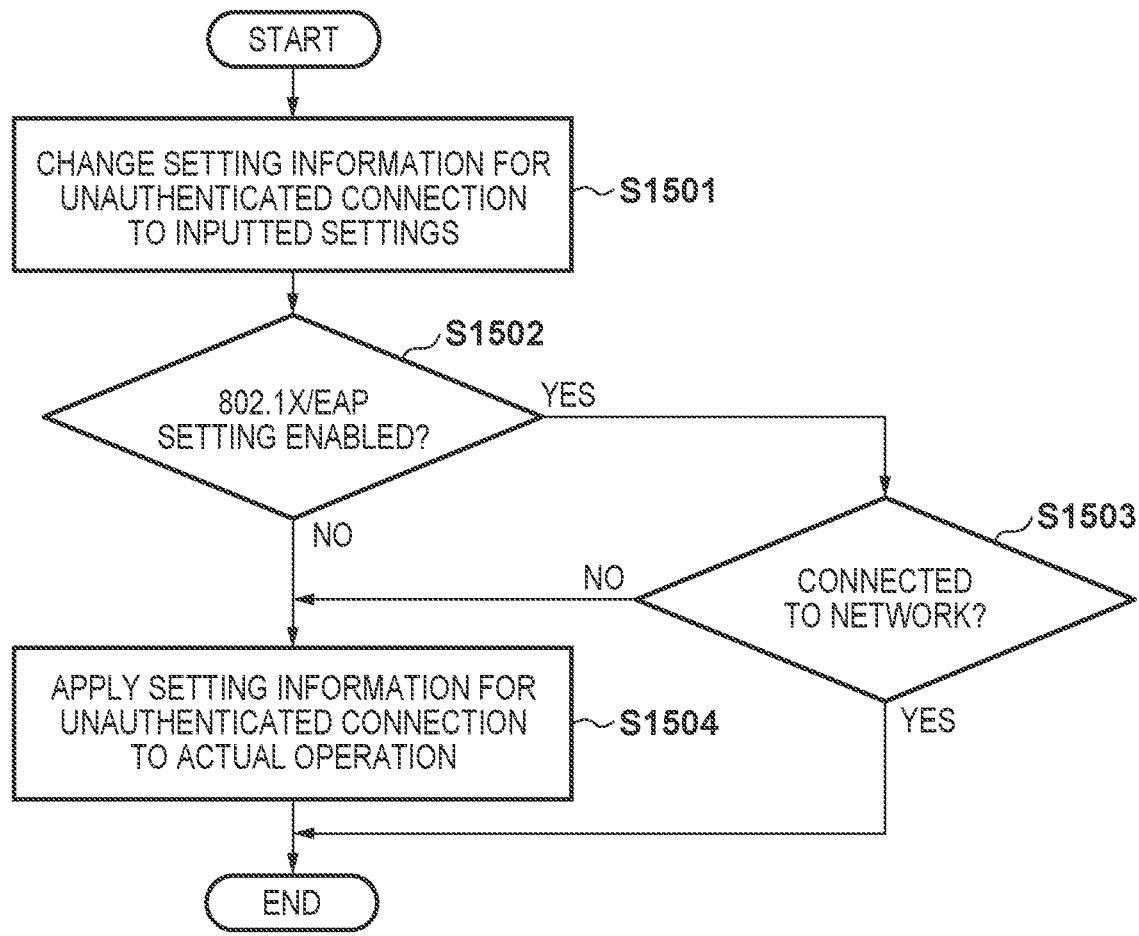

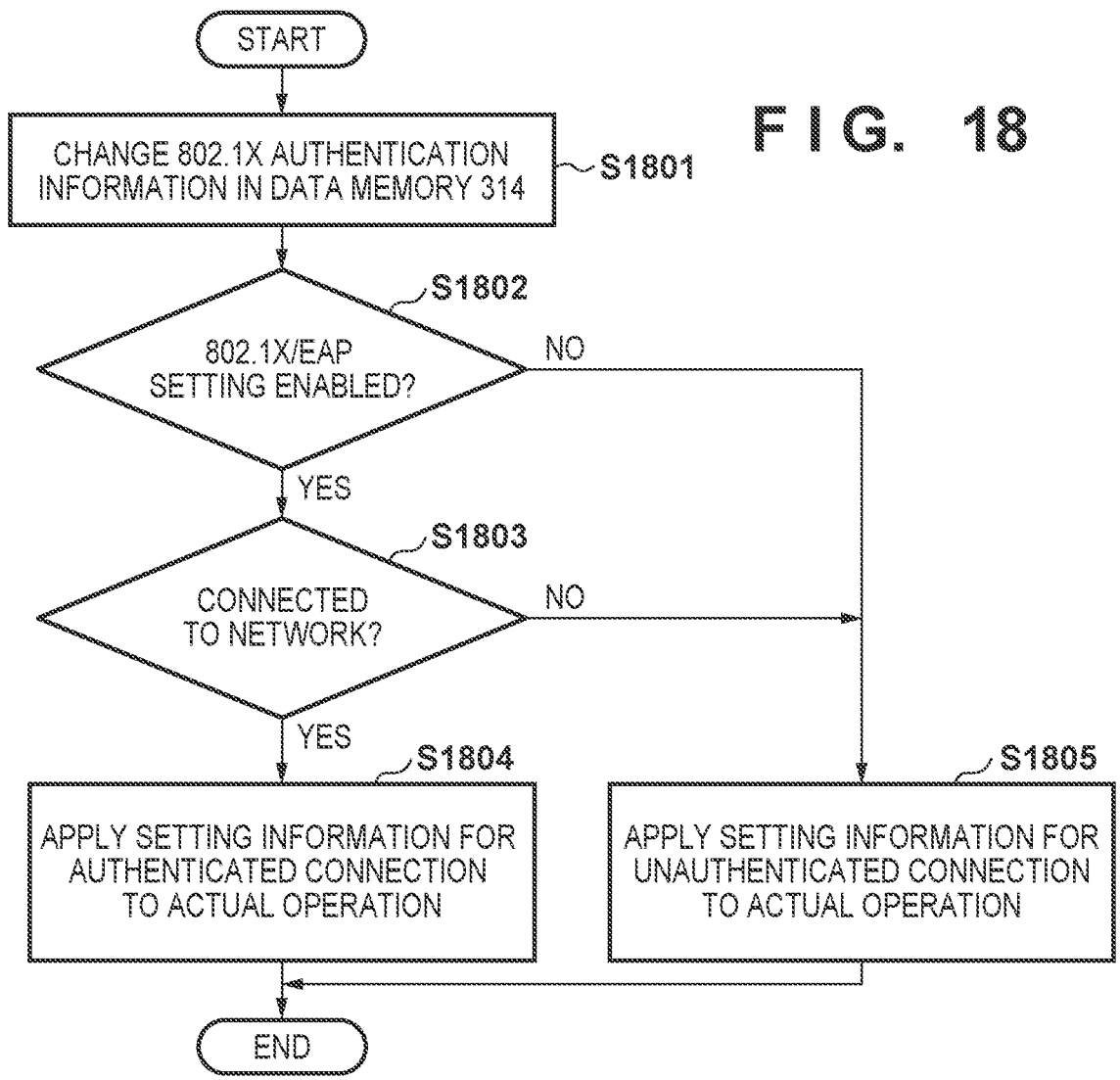

COMMUNICATION APPARATUS HAVING FIRST AND SECOND SETTING INFORMATION, CONTROL METHOD, AND STORAGE MEDIUM FOR STORING PROGRAM

This application is a continuation of application Ser. No. 18/132,461, filed Apr. 10, 2023.

BACKGROUND OF THE INVENTION

Field of the Invention

The present invention relates to a communication apparatus capable of communicating with an access point, a control method, and a storage medium for storing a program.

Description of the Related Art

In recent years, the number of printing apparatuses, such as multifunction peripherals and printers, having a wireless LAN function has increased. Such printing apparatuses are capable of performing wireless LAN communication with an information processing apparatus, such as a mobile phone or a personal computer operated by a user, and printing received print data. A printing apparatus and an information processing apparatus may be connected by infrastructure connection in which communication is performed via a wireless LAN access point. The information processing apparatus, the printing apparatus, and the access point can be connected to each other by operating in accordance with an IEEE 802.11 standard, and only the apparatuses that have been authorized by authentication processing, which is part of a connection operation, can be connected.

Wireless LAN authentication methods include a pre-shared key (PSK) method in which a PSK is used and a Simultaneous Authentication of Equals (SAE) method in which is SAE is used. In addition, authentication methods supporting both a wireless LAN and a wired LAN include an Extensible Authentication Protocol (EAP) method in which a communication apparatus connected to a network is authenticated using an authentication server supporting IEEE 802.1X/EAP.

An authentication network in which communication apparatuses to be connected are authenticated, such as a network conforming to the above IEEE 802.1X/EAP, is designed with an intent of improving security. Even in such an environment, there is a possibility that an authenticated communication apparatus operates under settings that go against that intent due to settings of the apparatus being changed by a non-administrator who does not have knowledge of networks. Examples include IP addresses of communication apparatuses being set to conflicting values and settings being such that communication to be encrypted is performed in plaintext. One example of a function for preventing such a situation is a function of authenticating a user who changes settings and applying a setting change only when they are authenticated to be an administrator. This function makes it possible to restrict a setting change by a non-administrator and maintain a state in which operation set by the administrator is performed.

Japanese Patent Laid-Open No. 2007-52740 discloses a method of managing a network device in which an administrator and a non-administrator are distinguished and by changing, in accordance therewith, how settings are displayed and which items can be changed, restrictions are applied to the changing of settings.

SUMMARY OF THE INVENTION

The present invention provides a communication apparatus for maintaining settings of a user with a relatively high authorization without hindering the convenience of a user with a relatively low authorization, a control method, and a storage medium for storing a program.

The present invention in one aspect provides a communication apparatus capable of communicating with an access point, the apparatus comprising: a storage unit configured to store, in at least one memory, each of first setting information, which can be changed by a first user and cannot be changed by a second user whose authorization for changing setting information related to a network is lower than that of the first user, and second setting information, which can be changed by the second user; an establishment unit configured to establish connection between the access point and the communication apparatus; and a control unit configured to operate the communication apparatus using the first setting information stored in the at least one memory in a case where a predetermined authentication method is used in communication in which the connection established by the establishment unit is used, and operate the communication apparatus using the second setting information stored in the at least one memory in a case where the predetermined authentication method is not used in the communication in which the connection established by the establishment unit is used.

According to the present invention, it is possible to maintain settings of a user with a relatively high authorization without hindering the convenience of a user with a relatively low authorization.

Further features of the present invention will become apparent from the following description of exemplary embodiments with reference to the attached drawings.

BRIEF DESCRIPTION OF THE DRAWINGS

FIG. 3 is a block diagram illustrating a configuration of the MFP.

FIGS. 4A to 4C are diagrams schematically illustrating a configuration of an operation display unit of the MFP.

FIG. 14 is a flowchart for explaining processing for when setting information for authenticated connection is changed.

FIG. 15 is a flowchart for explaining processing for when setting information for unauthenticated connection is changed.

FIG. 16 is a diagram illustrating a configuration of a memory.

FIG. 18 is a flowchart for explaining processing for when authentication information is changed.

FIG. 19 is a diagram illustrating a screen in which authentication information can be changed.

DESCRIPTION OF THE EMBODIMENTS

Figure 1:
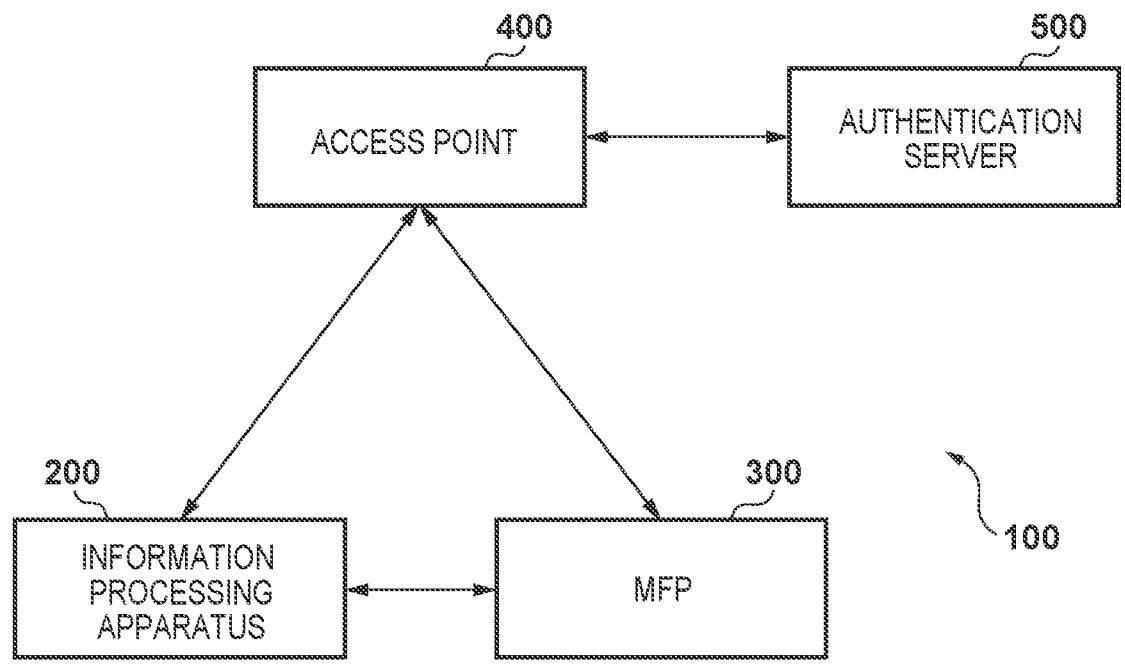
FIG. 1 is a diagram illustrating a configuration of a system.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

Even when a communication apparatus is not connected to a network in which authentication is necessary, if the communication apparatus operates under settings made by a user with a relatively high authorization, the use of the communication apparatus by a user with a relatively low authorization is restricted.

According to the present disclosure, it is possible to maintain settings of a user with a relatively high authorization without hindering the convenience of a user with a relatively low authorization.

First Embodiment

FIG. 1 is a diagram illustrating an example of a configuration of a system in the present embodiment. A communication system 100 is a communication system in which a plurality of communication apparatuses can communicate wirelessly with each other. As illustrated in FIG. 1, the communication system 100 includes an information processing apparatus 200, a multifunction peripheral (MFP) 300, and an access point (AP) 400, and an authentication server 500 as communication apparatuses. In the communication system 100, the information processing apparatus 200 and the MFP 300 can execute processing corresponding to a print service using, for example, wireless LAN communication.

The information processing apparatus 200 is an information processing apparatus having a function of communicating by a wireless LAN, a wired LAN, and the like. A wireless LAN may be referred to as a WLAN. For example, a smartphone, a notebook PC, a tablet terminal, or a personal digital assistant (PDA) is used as the information processing apparatus 200.

The MFP 300 is an example of a printing apparatus having a printing function. The MFP 300 may include a reading function (scanner), a fax function, and a telephone function. The MFP 300 also includes a communication function by which it is possible to wirelessly communicate with the information processing apparatus 200. Although the MFP 300 will be described in the present embodiment, an apparatus in a form different from the MFP 300 may be used. For example, a facsimile apparatus, a scanner apparatus, a projector, a mobile terminal, a smartphone, a notebook PC, a tablet terminal, a PDA, a digital camera, a music playback device, a TV, a smart speaker, augmented reality (AR) glasses, or the like having a communication function may be used. For example, the MFP 300 receives print data including image data from the information processing apparatus 200 connected via the access point 400 and forms an image based on that data. Alternatively, for example, the MFP 300 transmits image data read by a scanner function to the information processing apparatus 200 connected via the access point 400. Other kinds of information, such as control information, may also be exchanged with a network connected via the access point 400.

The access point 400 is a communication apparatus provided separately from (externally to) the information processing apparatus 200 and the MFP 300 and operates as a WLAN base station apparatus. The access point 400 may be referred to as the external access point 400 or an external wireless base station. A communication apparatus having a WLAN communication function can communicate in a WLAN infrastructure mode via the access point 400.

The wireless infrastructure mode, in other words, is a mode for a communication apparatus to communicate with the information processing apparatus 200 via the access point 400, which the communication apparatus is connected to. The access point 400 communicates with a communication apparatus allowed (authenticated) to connect with the access point 400 and relays wireless communication between that communication apparatus and another communication apparatus. The access point 400 is connected to a wired LAN communication network and relays communication between a communication apparatus connected to that network and another communication apparatus wirelessly connected to the access point 400. Further, when an authentication method of a network configured by the access point 400 is a method in which an authentication server is used (when the access point 400 supports an authentication method in which an authentication server is used), the access point 400 controls access of a communication apparatus connected to the network by authenticating the communication apparatus in cooperation with the authentication server 500. A communication apparatus connected to a network configured by the access point 400 is restricted from communicating with an apparatus other than the authentication server 500 until authenticated. The access point 400 may support an authentication method in which an authentication server is not used. Details of an authentication method in which an authentication server is used and an authentication method in which an authentication server is not used will be described later.

The authentication server 500 is a communication apparatus provided separately from (externally to) the information processing apparatus 200, the MFP 300, and the access point 400 and operates as an authentication server for collectively managing authentication information. The authentication server 500 performs authentication of a terminal to be authenticated in cooperation with the access point 400 and performs access control of the terminal based on an authentication result. The authentication server 500 is configured to be capable of executing authentication processing in accordance with, for example, an IEEE 802.1X standard.

The access point 400 corresponds to an authenticator in IEEE 802.1X. The information processing apparatus 200 and the MFP 300 correspond to supplicants in IEEE 802.1X. The authentication server is sometimes referred to as a "RADIUS server".

The authentication server 500 performs authentication according to, for example, an EAP-TLS method, an EAP-TTLS method, and a PEAP method in the IEEE 802.1X standard. The EAP-Transport Layer Security (EAP-TLS) method is an authentication method in which a TLS handshake protocol is used, and authentication is performed using a server certificate and a client certificate. The EAP-Tunneled TLS (EAP-TTLS) method is an authentication method in which a TLS handshake protocol is used, and authentication is performed using a server certificate, a username, and a password. In the Protected EAP (PEAP) method, authentication is performed using a username and a password. Such information used for IEEE 802.1X authentication may be collectively referred to as "authentication information".

The information processing apparatus 200 and the MFP 300 are capable of performing wireless communication, each using their WLAN communication function, according to the wireless infrastructure mode in which the external access point 400 is used or a peer-to-peer mode in which the external access point 400 is not used. The peer-to-peer mode may be referred to as a "P2P mode" or a "wireless direct mode" in contrast to the wireless infrastructure mode. The P2P mode, in other words, is a mode for a communication apparatus to directly communicate with the information processing apparatus 200 without going through the access point 400. The P2P mode includes a Wi-Fi Direct® mode, a software access point (software AP) mode, and the like. Wi-Fi Direct® may be referred to as WFD. That is, the wireless direct mode can be said to be a communication mode complying with an IEEE 802.11 series.

Figure 2:
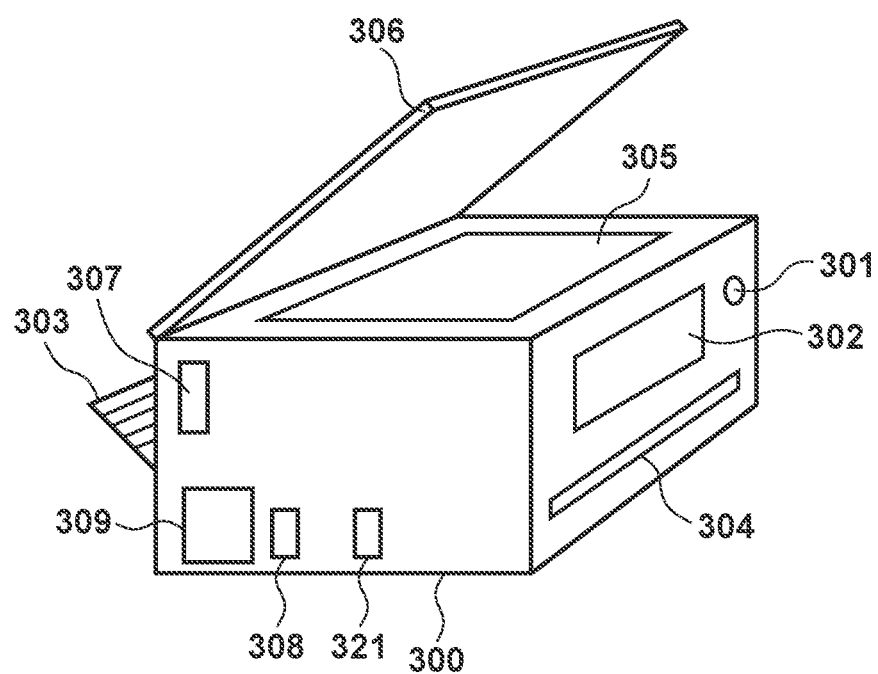
FIG. 2 is a diagram illustrating an external configuration of an MFP.

FIG. 2 is a diagram illustrating an example of an external configuration of the MFP 300. A power button 301 is a physical key by which a user can perform a power on and off operation. An operation display unit 302 includes a display and buttons used when the user operates the MFP 300. The operation display unit 302 includes keys, such as a character input key, a cursor key, a determination key, and a cancel key; a light emitting diode (LED); a liquid crystal display (LCD); and the like. The operation display unit 302 is configured to be capable of accepting the user's operation input when starting individual functions provided in the MFP 300, when changing various settings, and the like. The operation display unit 302 may be configured to include a touch panel display.

A printing sheet insertion port 303 is an insertion port in which sheets of various sizes can be set. The sheets set in the printing sheet insertion port 303 are conveyed one by one to a printing unit, desired printing is performed, and the sheets are discharged from a printing sheet discharge port 304. A document table 305 is a glass-like transparent table and is used for reading a set document by a scanner. A document cover 306 is a cover for pressing a document against the document table so as to prevent the document from floating at the time of reading by the scanner as well as for preventing external light from entering a scanner unit.

The MFP 300 has a function of communicating by a WLAN and a wired LAN and has a wireless communication unit 307 including an antenna or the like for wireless communication and a wired communication unit 321. The wireless communication unit 307 and the wired communication unit 321 need not always be configured to be externally visible. A USB communication 308 includes a circuit and a USB connector for the MFP 300 to communicate with the external information processing apparatus 200 or the like by USB connection. A power supply unit 309 connects to an external power source to provide power to the MFP 300.

FIG. 3 is a block diagram illustrating an example of a configuration of the MFP 300. The MFP 300 includes a main board 310 for controlling the entire apparatus, the power button 301, the operation display unit 302, the wireless communication unit 307, a wired communication unit 320, the USB communication unit 308, and the power supply unit 309.

The main board 310 is provided with a CPU 311 in a form of a microprocessor. The CPU 311 controls the MFP 300 according to a control program stored in a program memory 313 in a form of a ROM connected via an internal bus 312 and content stored in a data memory 314 in a form of a RAM connected via the internal bus 312. An operation of the MFP 300 described in the present embodiment is realized, for example, by the CPU 311 reading out and executing a program stored in the program memory 313. The CPU 311 reads a document by controlling a scanning unit 317 and stores read data in an image memory 315 in the data memory 314. The CPU 311 controls a printing unit 316 to print on a printing medium an image of the read data stored in the image memory 315 in the data memory 314. The CPU 311 performs USB communication by USB connection with the external information processing apparatus 200 by controlling the USB communication unit 308 via a USB communication control unit 320. The CPU 311 accepts operation information from the power button 301 and the operation display unit 302 by controlling an operation control unit 319. The CPU 311, for example, displays a state of the MFP 300 or a function selection menu on the operation display unit 302 by controlling the operation control unit 319. The CPU 311 controls the wireless communication unit 307 and the wired communication unit 320 via a communication control unit 318 in accordance with the operation information accepted by the operation display unit 302. The CPU 311, for example, changes settings for a communication method and performs settings for connecting with a network in accordance with the operation information.

The wireless communication unit 307 is a unit capable of providing a WLAN communication function. That is, the wireless communication unit 307 converts data into packets and transmits the packets to another communication apparatus in accordance with a WLAN standard. The wireless communication unit 307 also reconstructs original data from packets from another external communication apparatus and outputs the data to the CPU 311. The wireless communication unit 307 is configured to be capable of executing data (packet) communication in a WLAN system conforming to, for example, an IEEE 802.11 standard series (such as IEEE 802.11a/b/g/n/ac/ax). However, the present invention is not limited to this configuration, and the wireless communication unit 307 may be capable of performing communication of a WLAN system conforming to another standard. In the present embodiment, the wireless communication unit 307 is capable of communicating in both a 2.4-GHz frequency band and a 5-GHz frequency band. Further, the wireless communication unit 307 is capable of performing communication according to the WFD mode, communication according to the software AP mode, communication according to the wireless infrastructure mode, and the like. The information processing apparatus 200 and the MFP 300 are capable of performing wireless communication based on the WFD mode, and the wireless communication unit 307 has a software AP function or a group owner function. That is, the wireless communication unit 307 is capable of constructing a communication network in the P2P mode and determining a channel to be used for communication in the P2P mode.

The wired communication unit 321 is a unit for performing wired communication. The wired communication unit 321 is capable of data (packet) communication in, for example, a wired LAN (Ethernet) system conforming to an IEEE 802.3 series. Further, in wired communication using the wired communication unit 321, it is possible to communicate in a wired communication mode. The wired communication unit 321 is connected to the main board 310 via a bus cable or the like.

FIGS. 4A to 4C are diagrams schematically illustrating an example of a configuration of the operation display unit 302 of the MFP 300. FIG. 4A illustrates an example for when the operation display unit 302 is constituted by a touch panel display 331. Power is supplied to the MFP 300 by the user pressing the power button 301. When power is supplied to the MFP 300, the touch panel display 331 displays a home screen, which is a highest hierarchical layer of a menu that can be operated by the user. The home screen includes a copy region 335 for accepting an instruction for executing copy processing, a scan region 336 for accepting an instruction for executing scan processing, and a print region 337 for accepting an instruction for executing print processing. In addition, the home screen includes a state display region 332 indicating settings for connection according to the wireless infrastructure mode of the MFP 300 or connection according to the wireless direct mode of the MFP 300, and a connection state thereof. The home screen also includes a connection setting mode region 333 for the user to start operation of a connection setting mode at an arbitrary timing and a setting region 334 for allowing a change of various settings.

FIG. 4B illustrates an example of the operation display unit 302 constituted by a relatively small LCD display 341 and various physical keys 344 to 351. Power is supplied to the MFP 300 by the user pressing the power button 301. When power is supplied to the MFP 300, the LCD display 341 displays a home screen, which is a highest hierarchical layer of a menu that can be operated by the user. The user can operate a cursor displayed on the LCD display 341 by pressing the cursor movement buttons 346 and 347. The user presses the OK button 349 when they want to execute an operation and presses the back button 348 when they want to return to a previous menu screen. Further, when the user presses the QR button 344, a QR code containing information necessary for direct connection with the MFP 300 is displayed. When the displayed QR Code® is read from the information processing apparatus 200, the information processing apparatus 200 and the MFP 300 become directly connected to each other, allowing wireless communication therebetween. The code displayed here is not limited to a QR code and need only be a two-dimensional code. Further, when the user presses the connection setting mode button 345, it is possible to start the connection setting mode. In the connection setting mode, the MFP 300 can be connected to the access point 400 by the information processing apparatus 200 transmitting connection information to the MFP 300. If the stop button 350 is pressed by the user while the MFP 300 is performing each process, the respective process is canceled. When the copy start button 351 is pressed by the user, a document set on the document table 305 is scanned and printing is executed.

FIG. 4C illustrates an example of the operation display unit 302 configured by a relatively small LCD display 361 and various physical keys 363 to 370. Power is supplied to the MFP 300 by the user pressing the power button 301. When power is supplied to the MFP 300, the LCD display 361 displays a home screen, which is a highest hierarchical layer of a menu that can be operated by the user. The user can operate an item displayed on the LCD display 361 by pressing the movement buttons 364 and 365. The user presses the OK button 367 when they want to execute an operation and presses the back button 366 when they want to return to a previous menu screen. Further, when the user presses the connection setting mode button 363, it is possible to start the connection setting mode. In the connection setting mode, the MFP 300 can be connected to the access point 400 by the information processing apparatus 200 transmitting connection information to the MFP 300. If the stop button 368 is pressed by the user while the MFP 300 is performing each process, the respective process is canceled. When the copy start button 369 is pressed by the user, a document set on the document table 305 is scanned and printing is executed. When the setting button 370 is pressed by the user, the user can perform a change of various settings and the like.

Figure 5:
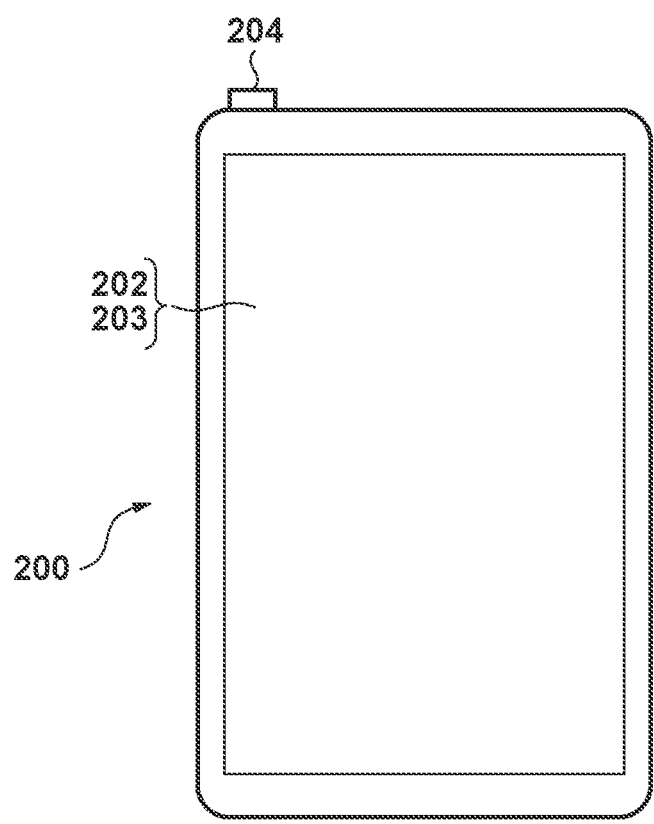
FIG. 5 is a diagram illustrating an external configuration of an information processing apparatus.

FIG. 5 is a diagram illustrating an example of an external configuration of the information processing apparatus 200. In the present embodiment, a case where the information processing apparatus 200 is a typical smartphone (mobile terminal) will be described as an example. The information processing apparatus 200 is configured to include, for example, a display unit 202, an operation unit 203, and a power key 204. The display unit 202 is, for example, a display including a liquid crystal display (LCD) display unit. The display unit 202 may display information using, for example, light emitting diodes (LEDs). The information processing apparatus 200 may have a speaker function of outputting information by audio in addition to or in place of the display unit 202. The operation unit 203 is configured to include physical keys, such as keys and buttons, a touch panel, and the like for detecting a user operation. In the present embodiment, since information display in the display unit 202 and user operation acceptance by the operation unit 203 are performed using a common touch panel display, the display unit 202 and the operation unit 203 are realized by one apparatus. In this case, for example, a button icon or a software keyboard is displayed using a display function of the display unit 202, and an operation reception function of the operation unit 203 detects that the user has touched these portions. Hardware for display and hardware for operation reception may be configured separately by the display unit 202 and the operation unit 203 being separated. The power key 204 is a physical key for accepting a user operation for turning the power of the information processing apparatus 200 on or off.

Figure 6:
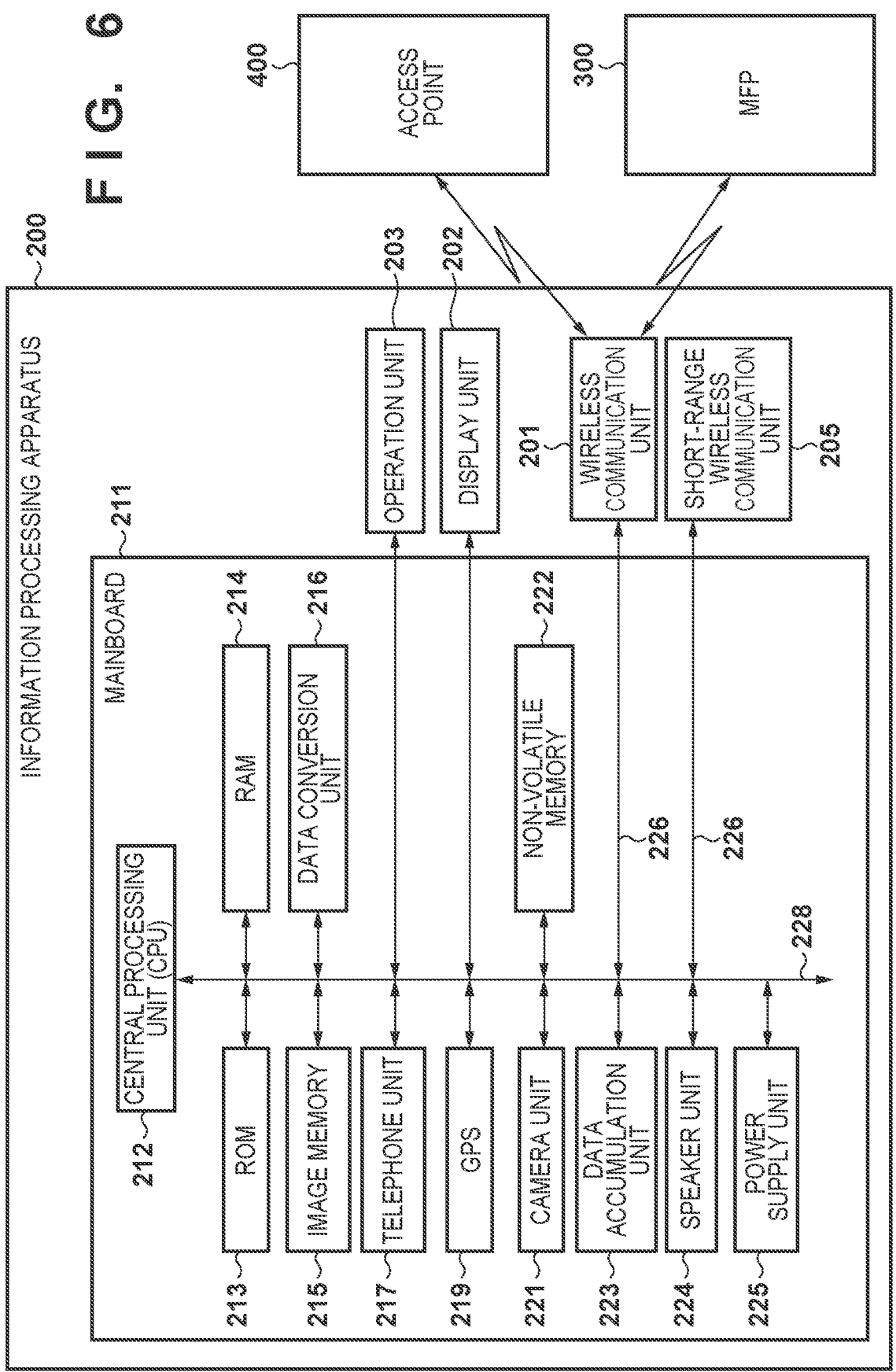
FIG. 6 is a diagram illustrating a configuration of the information processing apparatus.

The information processing apparatus 200 includes a wireless communication unit 201, which provides a WLAN communication function, as illustrated in FIG. 6. The wireless communication unit 201 is configured to be capable of executing data (packet) communication in a WLAN system conforming to, for example, the IEEE 802.11 standard series (such as IEEE 802.11a/b/g/n/ac/ax). However, the present invention is not limited to this configuration, and the wireless communication unit 201 may be capable of performing communication of a WLAN system conforming to another standard. In the present embodiment, the wireless communication unit 201 is capable of communicating in both a 2.4-GHz frequency band and a 5-GHz frequency band. Further, the wireless communication unit 201 is capable of performing communication according to the WFD mode, communication according to the software AP mode, communication according to the wireless infrastructure mode, and the like.

FIG. 6 is a diagram illustrating an example of a configuration of the information processing apparatus 200. The information processing apparatus 200 includes a main board 211 for controlling the entire apparatus, the wireless communication unit 201 for performing WLAN communication, the display unit 202, the operation unit 203, and a short-range wireless communication unit 205 for performing wireless communication different from the wireless communication unit 201. The main board 211 includes, for example, a CPU 212, a ROM 213, a RAM 214, an image memory 215, a data conversion unit 216, a telephone unit 217, a GPS 219, a camera unit 221, a non-volatile memory 222, a data accumulation unit 223, a speaker unit 224, and a power supply unit 225. GPS is an abbreviation for Global Positioning System. Each functional unit in the main board 211 is connected to each other via a system bus 228. The main board 211 and the wireless communication unit 201 and the main board 211 and the short-range wireless communication unit 205 are connected via a dedicated bus, for example. Further, the main board 211 and the display unit 202 and the main board 211 and the operation unit 203 are each connected via a dedicated bus, for example.

The CPU 212 is a system control unit and controls the entire information processing apparatus 200. An operation of the information processing apparatus 200 described in the present embodiment is realized, for example, by the CPU 212 reading out and executing a program stored in the ROM 213. Hardware dedicated to each process may be provided. The ROM 213 stores control programs to be executed by the CPU 212, an embedded operating system (OS) program, and the like. The CPU 212 performs software control, such as scheduling and task switching, by executing each of the control programs stored in the ROM 213 under the control of the embedded OS stored in the ROM 213. The RAM 214 is configured by a static RAM (SRAM) or the like. The RAM 214 stores data, such as a program control variable; setting values registered by the user; management data of the information processing apparatus 200; and the like. Further, the RAM 214 may be used as a buffer for various kinds of work. The image memory 215 is configured by a memory, such as a dynamic RAM (DRAM). The image memory 215 temporarily stores image data received via the wireless communication unit 201 and image data read out from the data accumulation unit 223 for processing in the CPU 212. The non-volatile memory 222 is configured by a memory, such as a flash memory, and continues to store data even when the power of the information processing apparatus 200 is turned off. A memory configuration of the information processing apparatus 200 is not limited to the above-described configuration. For example, the image memory 215 and the RAM 214 may be in common or data may be backed up or the like using the data accumulation unit 223. In the present embodiment, a DRAM is given as an example of the image memory 215; however, another storage medium, such as a hard disk or a non-volatile memory, may be used.

The data conversion unit 216 analyzes various formats of data and performs data conversion, such as color conversion and image conversion. The telephone unit 217 controls a telephone line and realizes telephone communication by processing audio data inputted and outputted via the speaker unit 224 including a microphone and a speaker. The GPS 219 receives radio waves transmitted from a satellite and obtains position information, such as the current latitude and longitude of the information processing apparatus 200. The camera unit 221 has a function of electronically recording and encoding an image that has entered through a lens. Image data obtained by image capturing by the camera unit 221 is stored in the data accumulation unit 223. The speaker unit 224 performs a function of inputting or outputting audio for a telephone function and also performs control for realizing a function, such as alarm notification. The power supply unit 225 is, for example, a portable battery, and controls supply of power into the apparatus. Power supply states of the information processing apparatus 200 include, for example, a battery exhausted state in which there is no remaining amount in the battery, a power-off state in which the power key 204 is not pressed, a power-on state (active state) in which the power key 204 is pressed, and a power saving state in which the apparatus is in a power saving mode in which the apparatus is active but power consumption of individual components is suppressed. The display unit 202 electronically controls display content and executes control for performing display of various types of input content and an operation state and a status state of the MFP 300, and the like. The operation unit 203 executes control, such as control for generating an electric signal corresponding to a user operation in accordance with acceptance of that operation and outputting the generated electric signal to the CPU 212.

The information processing apparatus 200 performs wireless communication using the wireless communication unit 201 and performs data communication with another communication apparatus, such as the MFP 300. The wireless communication unit 201 converts data into packets and transmits the packets to another communication apparatus. The wireless communication unit 201 also reconstructs original data from packets from another external communication apparatus and outputs the data to the CPU 212. The wireless communication unit 201 is a unit for realizing communication conforming to a standard, such as WLAN. The short-range wireless communication unit 205 performs communication by a communication system different from the wireless communication unit 201, such as Bluetooth®. The configuration of the main board 211 is not limited to the above. For example, the individual functions of main board 211 realized by the CPU 212 may be realized by a processing circuit, such as an application specific integrated circuit (ASIC), or may be realized by either hardware or software.

Figure 7:
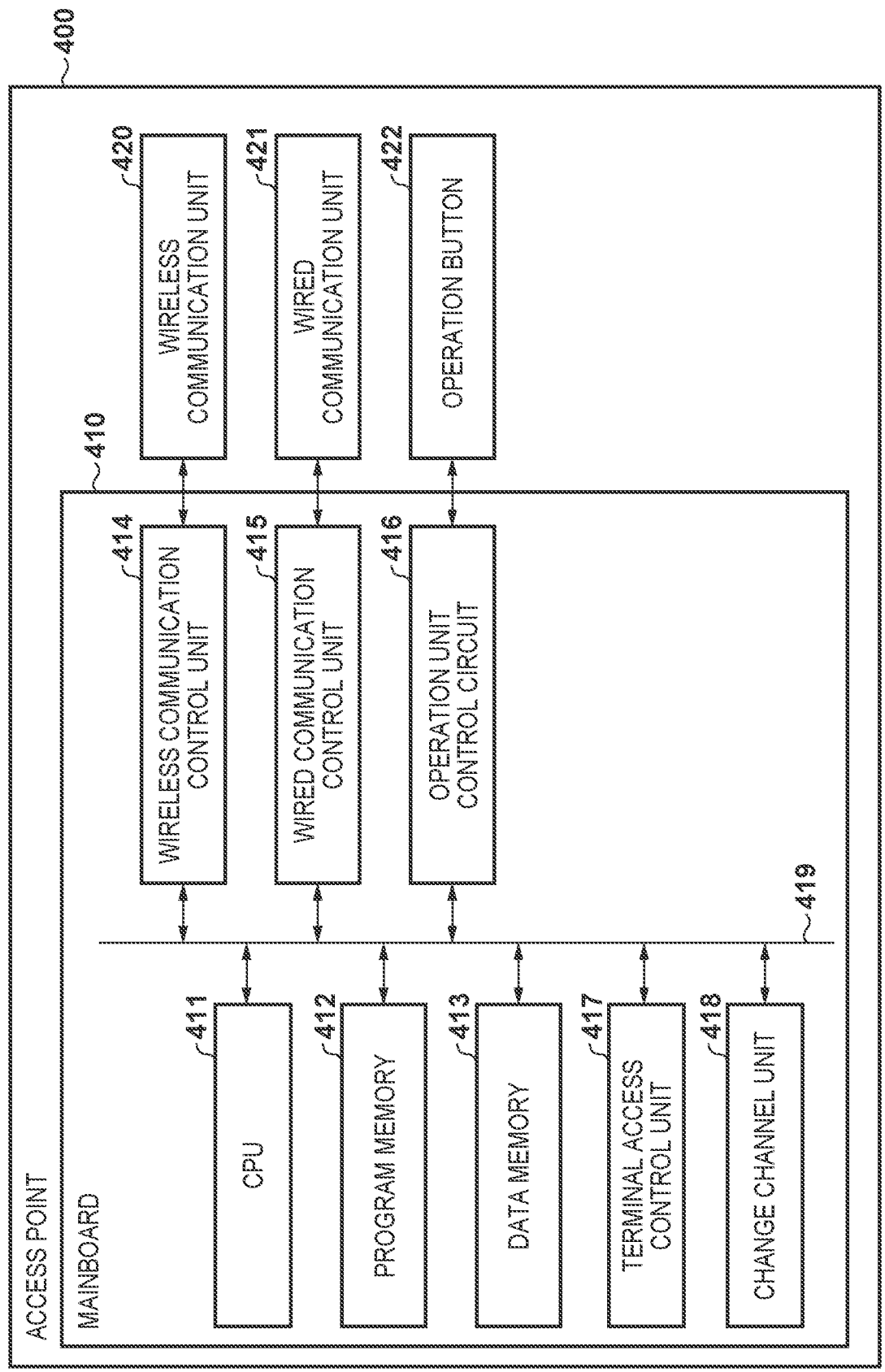
FIG. 7 is a block diagram illustrating a configuration of an access point.

FIG. 7 is a block diagram illustrating an example of a configuration of the access point 400 having a wireless LAN access point function. The access point 400 includes a main board 410 for controlling the access point 400, a wireless communication unit 420, a wired communication unit 421, and an operation button 422. These are connected to each other via an internal bus 419 so as to be capable of communication.

The main board 410 is provided with a CPU 411 in a form of a microprocessor. The CPU 411 operates according to a control program stored in a program memory 412 in a form of a ROM connected via an internal bus 418 and content stored in a data memory 413 in a form of a RAM connected via the internal bus 418. An operation of the access point 400 described in the present embodiment is realized, for example, by the CPU 411 reading out and executing a program stored in the program memory 412. The CPU 411 performs wireless LAN communication with another communication apparatus by controlling the wireless communication unit 420 via a wireless communication control unit 414. The CPU 411 performs wired LAN communication with another communication apparatus by controlling the wired communication unit 421 via a wired communication control unit 415. The CPU 411 accepts an operation from the user by the operation button 422 via an operation unit control circuit 416.

The access point 400 includes a terminal access control unit 417. The terminal access control unit 417 protects a network by authenticating a communication apparatus connected to the network. The terminal access control unit 417 authenticates a communication apparatus connected to the network according to various methods. The various methods include, for example, a pre-shared key (PSK) method in which a PSK is used, a Simultaneous Authentication of Equals (SAE) method in which is SAE is used, and an EAP method in which the authentication server 500 supporting IEEE 802.1X/EAP is used. In an IEEE 802.1X authentication method, EAP is used, and so the IEEE 802.1X authentication method is indicated as an IEEE 802.1X/EAP authentication method. The IEEE 802.1X/EAP authentication method is also described as the EAP method. A channel of communication thus authenticated can be changed or switched by a channel change unit 418. In the present embodiment, assume that authentication methods in which an authentication server is not used are the PSK method and the SAE method, and an authentication method in which an authentication server is used is the EAP method. An authentication method in which an authentication server is not used is also referred to as a Personal method, and an authentication method in which an authentication server is used is also referred to as an Enterprise method.

Figure 8:
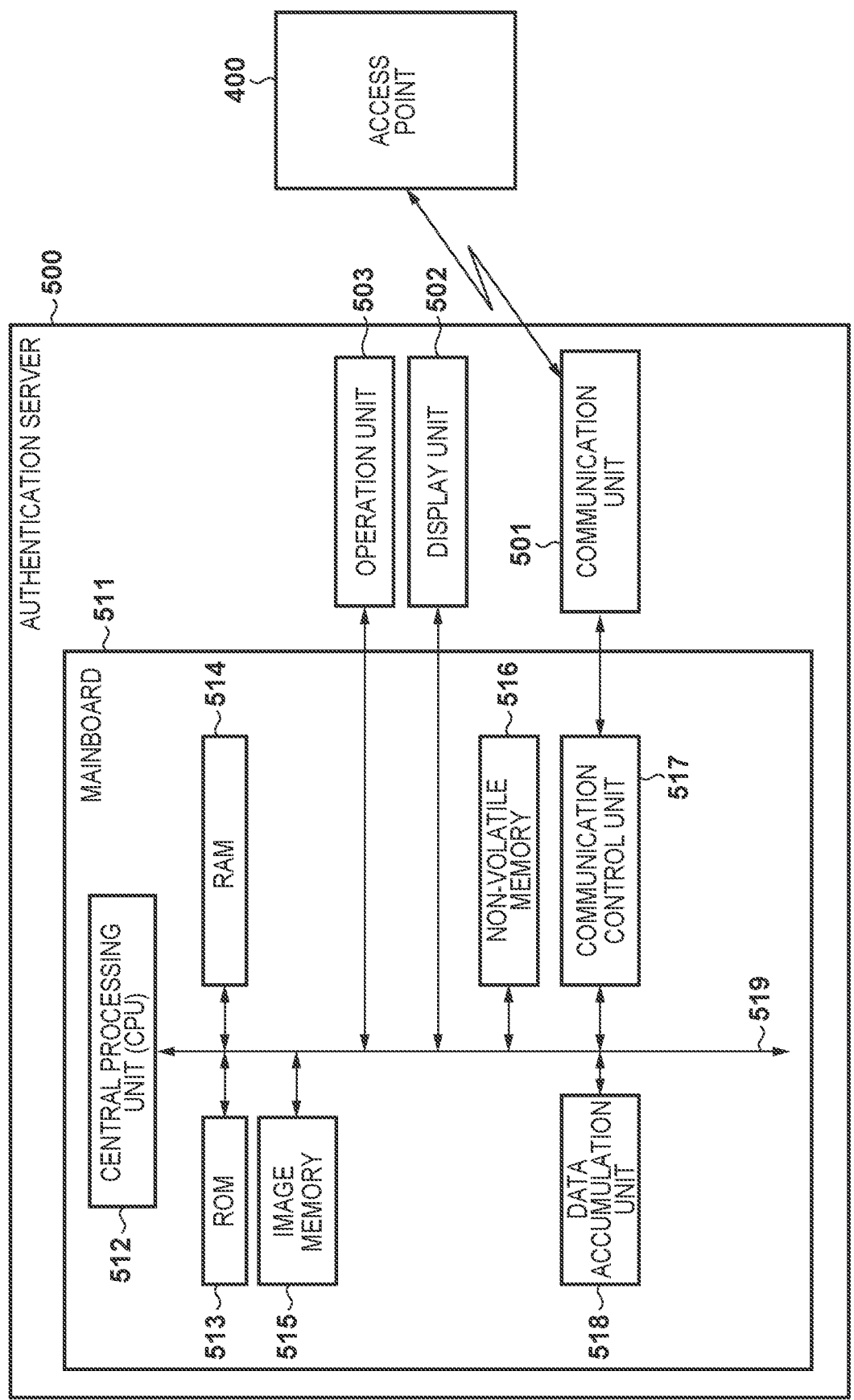
FIG. 8 is a diagram illustrating a configuration of an authentication server.

FIG. 8 is a diagram illustrating an example of a configuration of the authentication server 500. The authentication server 500 includes a main board 511 for controlling the authentication server 500, a communication unit 501 for performing wired LAN communication and the like, a display unit 502, and an operation unit 503. The main board 511 includes a CPU 512, a ROM 513, a RAM 514, an image memory 515, a non-volatile memory 516, a data storage unit 518, and a communication control unit 517. Each functional unit in the main board 511 is connected to each other via a system bus 519. Further, the main board 511 and the communication unit 501, the main board 511 and the display unit 502, and the main board 511 and the operation unit 503 are each connected via a dedicated bus, for example.

The CPU 512 is a system control unit and controls the entire authentication server 500. An operation of the authentication server 500 described in the present embodiment is realized, for example, by the CPU 512 reading out and executing a program stored in the ROM 513. Hardware dedicated to each processing may be provided. The ROM 513 stores control programs to be executed by the CPU 512, an embedded operating system (OS) program, and the like. The CPU 512 performs software control, such as scheduling and task switching, by executing each of the control programs stored in the ROM 513 under the control of the embedded OS stored in the ROM 513. The RAM 514 is configured by a static RAM (SRAM) or the like. The RAM 514 stores data, such as a program control variable; setting values registered by the user; management data of the authentication server 500; and the like. Further, the RAM 514 may be used as a buffer for various kinds of work. The image memory 515 is configured by a memory, such as a dynamic RAM (DRAM). The image memory 515 temporarily stores image data received via the communication unit 501 and image data read out from the data storage unit 518 for processing in the CPU 512. The data storage unit 518 is configured by a storage medium, such as a solid state drive (SSD), for example, and continues to store data even when the power of the authentication server 500 is turned off. In the present embodiment, an SSD is given as an example of the data storage unit 518; however, another storage medium, such as a hard disk or a non-volatile memory, may be used. The display unit 502 electronically controls display content and executes control for performing display of various types of input content and a status state, and the like. The operation unit 503 executes control, such as generating an electric signal corresponding to a user operation in accordance with reception of that operation and outputting the generated electric signal to the CPU 512.

The CPU 512 controls the communication control unit 517 to perform communication using the communication unit 501 and performs data communication with another communication apparatus, such as the access point 400. The communication unit 501 converts data into packets and transmits the packets to another communication apparatus. The communication unit 501 also reconstructs original data from packets from another external communication apparatus and outputs the data to the CPU 512. The communication unit 501 is capable of data (packet) communication in, for example, a wired LAN (Ethernet) system conforming to the IEEE 802.3 series.

Communication modes in which communication apparatuses in the communication system 100 can operate will be described in the following.

[Wireless Direct Mode (P2P Mode)]

A method of communication according to the wireless direct mode in which apparatuses communicate directly and wirelessly with each other without going through an external access point in WLAN communication will be described. Communication according to the wireless direct mode can be realized using a plurality of techniques, and for example, a communication apparatus performs communication according to the wireless direct mode by selectively using any of the above-described wireless direct modes. Communication according to the wireless direct mode may be referred to as "wireless direct communication" or "P2P communication".

For example, a communication apparatus capable of executing wireless direct communication is configured to support at least one of two modes: the software AP mode and the Wi-Fi Direct (WFD) mode. Meanwhile, even if an apparatus is a communication apparatus capable of executing wireless direct communication, the apparatus need not support all of the modes and may be configured to support only some of the modes. In the present embodiment, a communication apparatus can support the wireless infrastructure mode in addition to the wireless direct mode.

A communication apparatus (e.g., the information processing apparatus 200) having a function for communicating according to the WFD mode invokes an application for realizing the communication function by accepting a user operation via an operation unit. Then, communication according to the WFD mode is executed based on a user operation accepted via a user interface screen provided by the application. The MFP 300 operating in the P2P mode operates as a master in connection and communication with another apparatus. That is, in the software AP mode, the MFP 300 operates as a software access point (AP). Then, in the WFD mode, the MFP 300 operates as a group owner. The present invention is not limited to this regarding the WFD mode, and the MFP 300 may operate as a station by a group owner negotiation being executed. FIG. 10C illustrates a state in which the MFP 300 operates in the P2P mode. In this state, communication between the MFP 300 and the information processing apparatus 200 may be realized without going through the authentication server 500 or the access point 400.

[Wireless Infrastructure Mode]

In contrast to the wireless direct mode, in the wireless infrastructure mode, communication apparatuses communicating with each other are connected to an external access point for controlling a network, and communication between the communication apparatuses is performed via the external access point. The communication apparatuses here, for example, are the information processing apparatus 200 and the MFP 300. In other words, communication between communication apparatuses is performed via a network constructed by an external access point. The MFP 300 operating in the wireless infrastructure mode operates as a station in connection and communication with the access point 400. In the wireless infrastructure mode, each communication apparatus searches for an external access point by transmitting a device search request (ProbeRequest). When each communication apparatus receives a device search response (ProbeResponse) from the external access point, each communication apparatus displays an SSID included in ProbeResponse. For example, communication of the information processing apparatus 200 and the MFP 300 in the wireless infrastructure mode via the access point 400 becomes possible by each of these communication apparatuses discovering the access point 400, transmitting a connection request to the access point 400, and connecting to the access point 400. A plurality of communication apparatuses may be connected to different access points. In this case, communication between the communication apparatuses becomes possible by data being transferred between each of the access points. Commands and parameters defined in a Wi-Fi standard are used for commands and parameters transmitted and received during communication between each communication apparatus via an access point. In such a configuration, the access point 400 determines a frequency band and a frequency channel. Therefore, the access point 400 selects which frequency band between 5 GHz and 2.4 GHz is to be used and which frequency channel is to be used in that frequency band.

When the information processing apparatus 200 and the MFP 300 connect to a wireless LAN configured by the access point 400, authentication is performed by the access point 400. The information processing apparatus 200 and the MFP 300 can connect to the wireless LAN by being authenticated according to an authentication method of a wireless LAN configured by the access point 400. Wireless LAN authentication methods include the PSK method in which a pre-shared key is used, the SAE method in which SAE is used, the EAP method in which an authentication server supporting IEEE 802.1X/EAP is used, and the like.

Figure 10A:
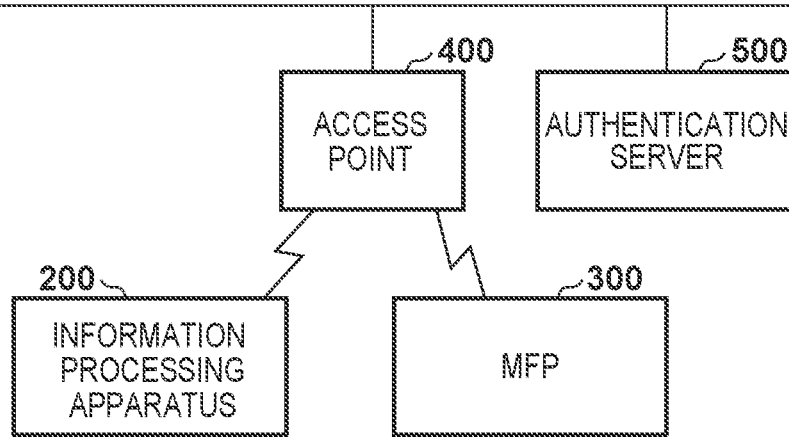
FIGS. 10A to 10C are diagrams illustrating a network between apparatuses.

FIG. 10A illustrates a state in which the MFP 300 operates in the wireless infrastructure mode in which the MFP 300 is connected to the access point 400, which supports IEEE 802.1X authentication. In this state, communication between the MFP 300 and the information processing apparatus 200 may be realized based on authentication performed by the authentication server 500 in cooperation with the access point 400.

Figure 10B:
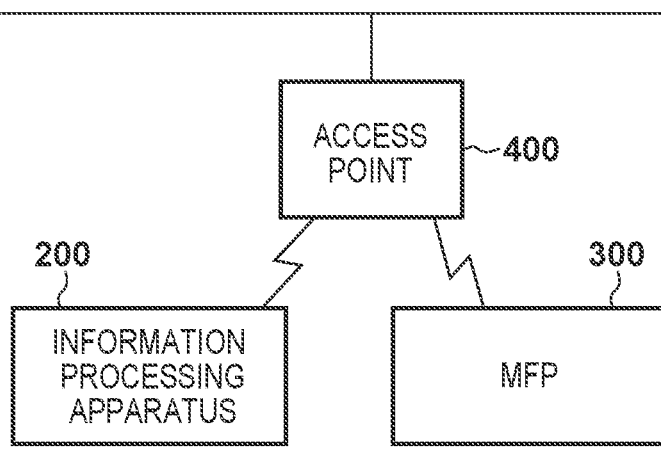
Figure 10C:
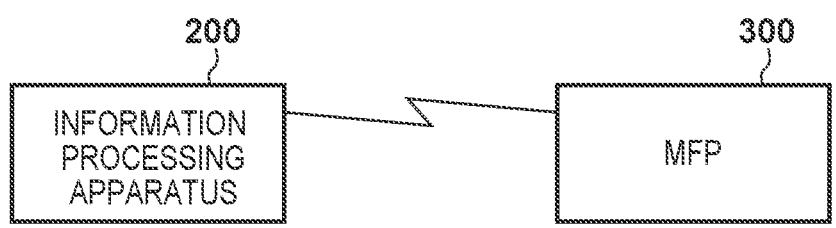

FIG. 10B illustrates a state in which the MFP 300 operates in the wireless infrastructure mode in which the MFP 300 is connected to the access point 400, which does not support IEEE 802.1X authentication. In this state, communication between the MFP 300 and the information processing apparatus 200 may be realized without authentication performed by the authentication server 500 in cooperation with the access point 400.

[Wired Communication Mode]

The wired communication mode is a communication mode for communicating between communication apparatuses by a wired LAN or the like. The MFP 300 cannot operate in the wireless infrastructure mode when operating in the wired communication mode. In the wired communication mode, data (packet) communication in, for example, a wired LAN (Ethernet) system conforming to the IEEE 802.3 series is executed. When the MFP 300 operates in a state in which an IEEE 802.1X/EAP setting is enabled, authentication is performed according to IEEE 802.1X when the MFP 300 connects to a wired LAN configured by the access point 400.

Next, user interface screens to be displayed on the operation display unit 302 of the MFP 300 and the display unit 202 of the information processing apparatus 200 in order to connect the MFP 300 to a network of the access point 400 whose authentication method is that in which the authentication server 500 is used will be described.

Figure 11A:
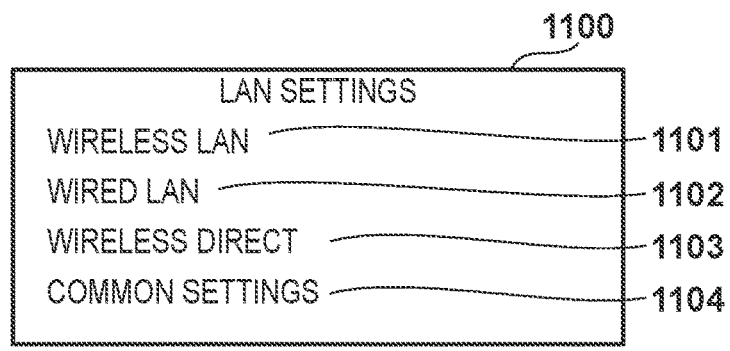
FIGS. 11A to 11K are diagrams illustrating screen transitions in the operation display unit of the MFP.

FIGS. 11A to 11K are diagrams illustrating screen transitions for when "LAN settings" 342 is selected from a setting menu of the screen 341 of FIG. 4B in the operation display unit 302 of the MFP 300. A screen 1100 illustrated in FIG. 11A is a screen that is displayed when "LAN settings" 342 is selected in the screen 341 of FIG. 4B and is a screen in which LAN settings can be changed by the user. For example, "wireless LAN" 1101, "wired LAN" 1102, "wireless direct" 1103, and "common settings" 1104 are displayed on the screen 1100. When connecting an access point supporting the Personal method and the MFP 300, the user selects "wireless LAN" 1101.

Figure 11B:
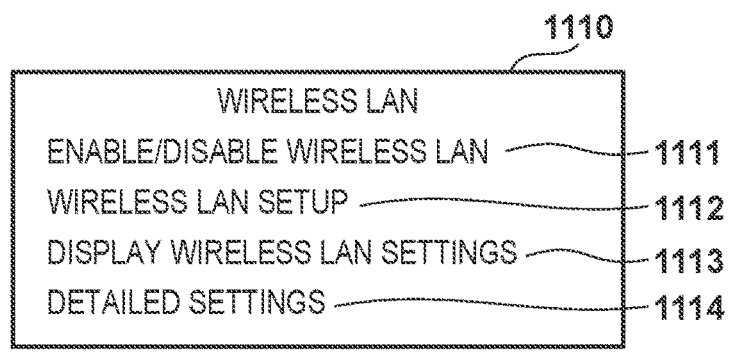

A screen 1110 illustrated in FIG. 11B is a screen that is displayed when "wireless LAN" 1101 is selected in the screen 1100 of FIG. 11A and is a screen in which wireless LAN settings can be changed by the user. For example, "enable/disable wireless LAN" 1111, "wireless LAN setup" 1112, "display wireless LAN settings" 1113 and "detailed settings" 1114 are displayed on the screen 1110. "Enable/disable wireless LAN" 1111 is a region for setting whether to enable or disable a state in which the MFP 300 can communicate using a wireless LAN. By a user operation being accepted in a display screen after that region has been selected, a state in which the MFP 300 can communicate using a wireless LAN is set to disabled or enabled. While that state is set to disabled, the MFP 300 does not execute communication or connection in which a wireless LAN is used.

Figure 11C:
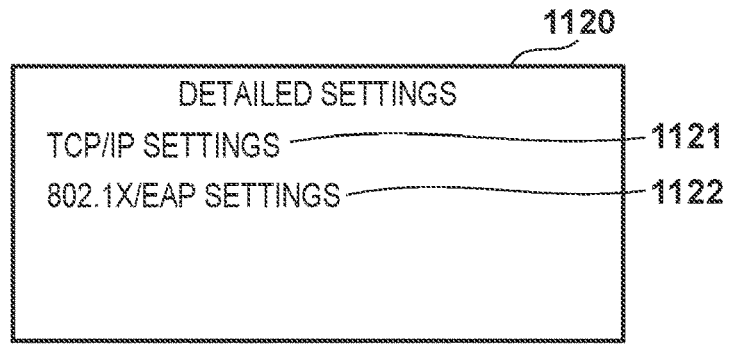
Figure 11D:
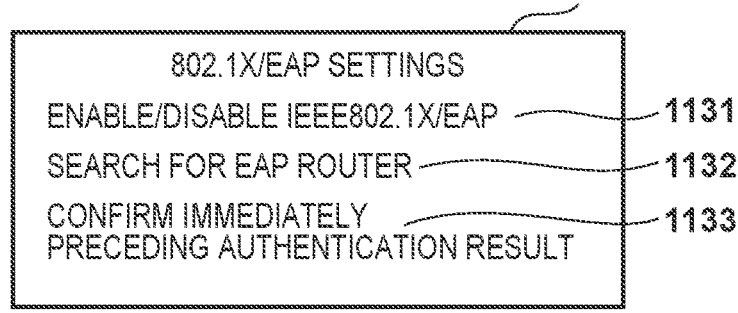

A screen 1120 illustrated in FIG. 11C is a screen that is displayed when "detailed settings" 1114 is selected in the screen 1110 of FIG. 11B and is a screen in which detailed LAN settings can be changed by the user. For example, "TCP/IP settings" 1121 and "802.1X/EAP settings" 1122 are displayed on the screen 1120. A screen 1130 illustrated in FIG. 11D is a screen that is displayed when "802.1X/EAP settings" 1122 is selected in the screen 1120 of FIG. 11C and is a screen in which IEEE 802.1X/EAP settings can be changed by the user. For example, "enable/disable IEEE 802.1X/EAP" 1131, "search for EAP router" 1132, and "confirm immediately preceding authentication result" 1133 are displayed on the screen 1130.

Figure 11E:
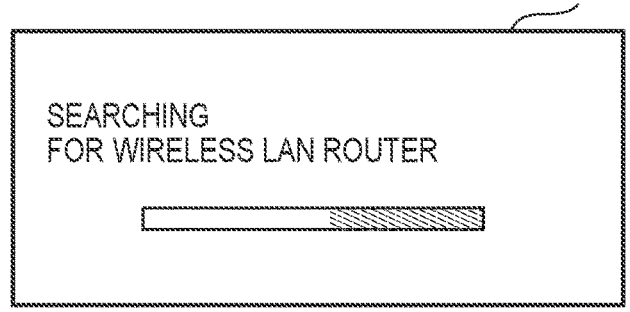

A screen 1140 illustrated in FIG. 11E is a screen that is displayed while a search for a wireless access point whose authentication method is that in which the authentication server 500 is used is being performed, when the IEEE 802.1X/EAP setting is enabled and "search for EAP router" 1132 is selected in the screen 1130. A wireless access point search is processing for searching for an access point present in a vicinity of the MFP 300. The screen 1140 illustrated in FIG. 11E is also displayed while a search for a wireless access point whose authentication method is that in which the authentication server 500 is not used is being performed, when "wireless LAN setup" 1112 is selected in the screen 1110 of the FIG. 11B.

Figure 11F:
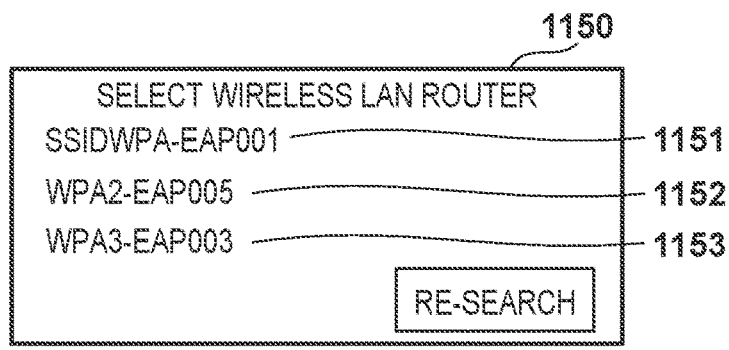

A screen 1150 illustrated in FIG. 11F is a screen in which service set identifiers (SSIDs) of wireless access points are displayed in a list as a result of the wireless access point search. When "search for EAP router" 1132 is selected, an EAP router search is executed, and only SSIDs of wireless access points whose authentication method is the IEEE 802.1X/EAP authentication method are displayed in the screen 1150 illustrated in FIG. 11F. Since an access point in the present embodiment is, for example, a router, a router search is, in other words, a wireless access point search. Also, when "wireless LAN setup" 1112 is executed, only SSIDs of wireless access points whose authentication method is not the IEEE 802.1X/EAP authentication method are displayed. SSIDs "WPA-EAP0001", "WPA2-EAP005", and "WPA3-EAP003" are displayed as SSIDs 1151 to 1153 in the screen 1150 illustrated in FIG. 11F. They correspond to a WPA-EAP method, a WPA2-EAP method, and a WPA3-EAP method, respectively. As another example of display, known methods such as a WPA-PSK method, a WPA-PSK method, a WPA3-SAE method may be indicated, and an Open method may be indicated as an auxiliary.

Figure 11G:
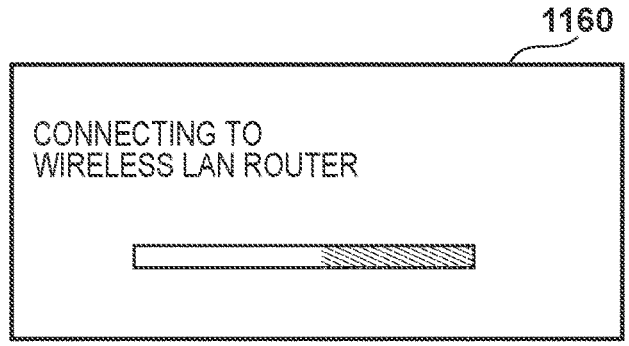
Figure 11H:
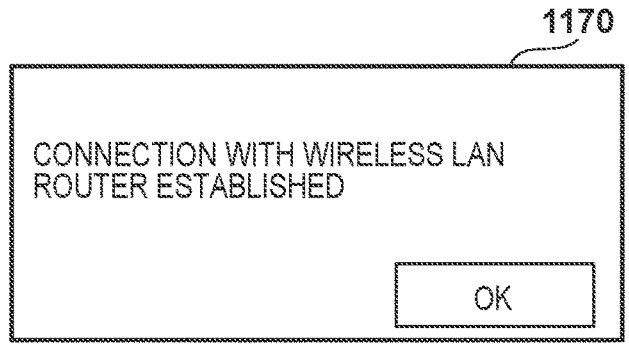

A screen 1160 illustrated in FIG. 11G is a screen that is displayed while connection processing is being executed with a wireless access point, when any of the SSIDs 1151, 1152, and 1153 of the wireless access points is selected in the screen 1150 of the FIG. 11F. A screen 1170 illustrated in FIG. 11H is a screen that is displayed after the screen 1160 of the FIG. 11G has been displayed when an attempt to connect to an access point is completed and connection has been successfully established or the connection has advanced to a predetermined stage.

Figure 11I:
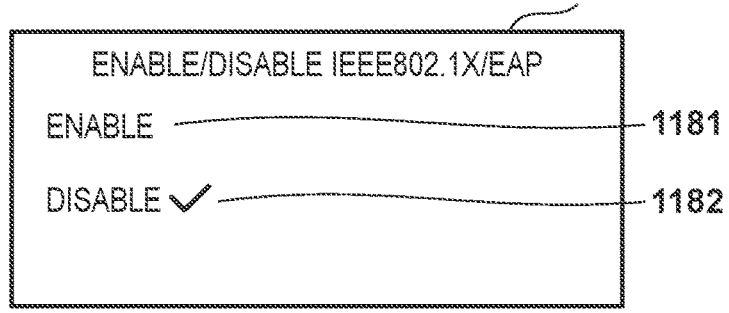
Figure 11J:
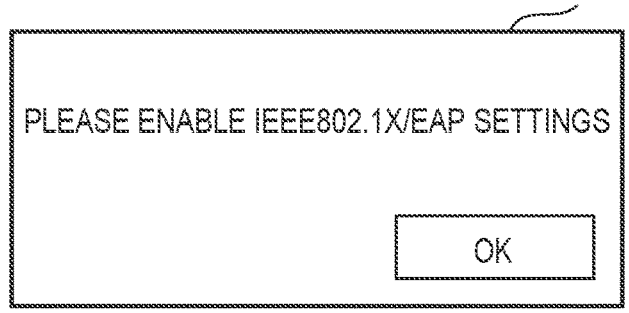
Figure 11K:
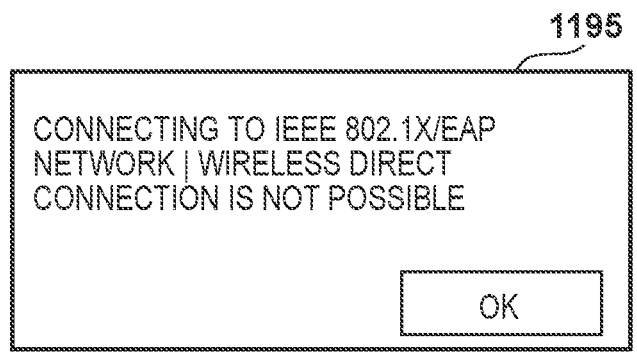

A screen 1180 illustrated in FIG. 11I is a screen that is displayed when "enable/disable IEEE 802.1X/EAP" 1131 is selected in the screen 1130 of FIG. 11D and is a screen in which enabling/disabling of the IEEE 802.1X/EAP setting can be changed by the user. Assume that "enable" 1181 and "disable" 1182 are displayed in the screen 1180. While the IEEE 802.1X/EAP setting is set to disabled, the MFP 300 does not connect to an access point according to IEEE 802.1X/EAP. A screen 1190 illustrated in FIG. 11J is a screen that is displayed when "search for EAP router" 1132 is selected in the screen 1130 of FIG. 11D when the IEEE 802.1X/EAP setting is set to disabled. That is, in the present embodiment, when the IEEE 802.1X/EAP setting is disabled, even if "search for EAP router" 1132 is selected, a router search is not performed. A screen 1195 illustrated in FIG. 11K is a screen that is displayed when "wireless direct" 1103 is selected in the screen 1100 of FIG. 11A while the IEEE 802.1X/EAP setting is set to enabled. As described above, in the present embodiment, when "wireless direct" 1103 is selected when the IEEE 802.1X/EAP setting is set to enabled, a message that connection according to the wireless direct mode is not performed is displayed.

Control for not executing connection with an access point according to IEEE 802.1X/EAP authentication, which is executed when the IEEE 802.1X/EAP setting is disabled, is not limited to the above-described control. For example, a configuration may be taken such that the MFP 300 performs a router search but does not display access points for which IEEE 802.1X/EAP authentication is enabled in a list of access points discovered by the router search. Alternatively, a configuration may be taken such that access points for which IEEE 802.1X/EAP authentication is enabled are displayed in a list, but even if the user selects an access point for which IEEE 802.1X/EAP authentication is enabled, the MFP 300 does not execute processing for connecting to it.

Figure 9:
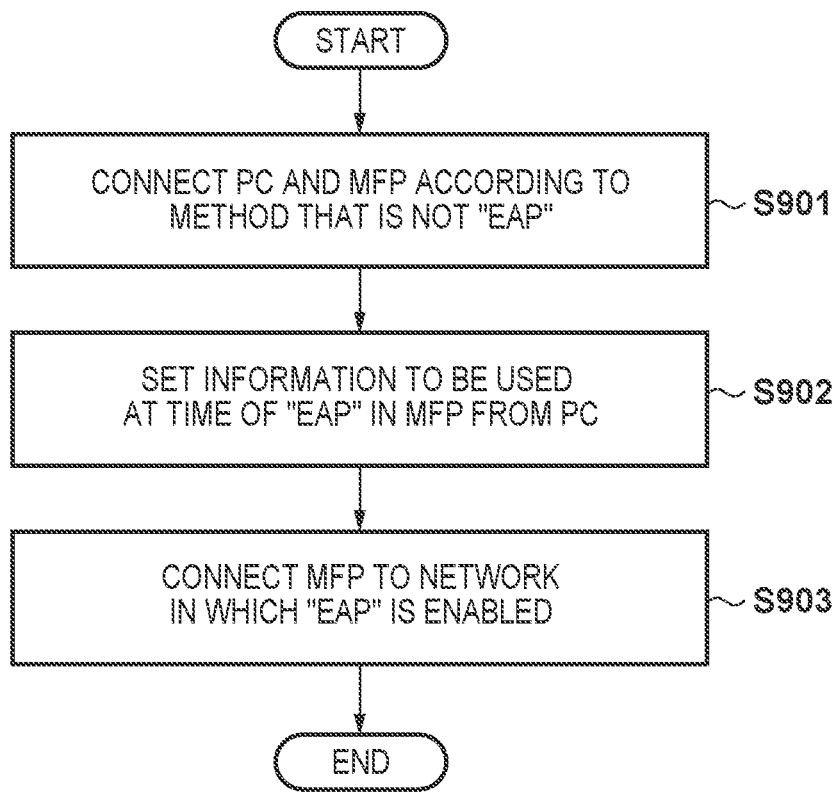
FIG. 9 is a flowchart for explaining an overview of processing for connecting the MFP to a network configured by an access point.

When connecting the MFP 300 to a network in which IEEE 802.1X/EAP authentication is enabled, it is necessary to perform authentication after setting information necessary for authentication in the MFP 300. An overview of processing for connecting the MFP 300 to a network in which IEEE 802.1X/EAP authentication is enabled and which is configured by the access point 400 in the present embodiment will be described with reference to FIG. 9.

First, in step S901, the information processing apparatus 200 and the MFP 300 are connected according to a connection method in which IEEE 802.1X/EAP authentication is not used. In step S901, the information processing apparatus 200 and the MFP 300 are connected to a network which is configured by the access point 400 and in which IEEE 802.1X/EAP authentication is not used, as illustrated in FIG. 10B, making it possible for the communication apparatuses to communicate via the access point 400. A network in which IEEE 802.1X/EAP authentication is not used is, for example, a network whose authentication method is such that the authentication server 500 is not used. The information processing apparatus 200 and the MFP 300 may be connected by connecting the information processing apparatus 200 to a network configured such that the MFP 300 serves as a master in the wireless direct mode as illustrated in FIG. 10C. That is, specifically, in step S901, the MFP 300, for example, receives a connection request from the information processing apparatus 200, and connection is established between the information processing apparatus 200 and the MFP 300 operating in the P2P mode.

Next, in step S902, the information processing apparatus 200 transmits IEEE 802.1X/EAP authentication information to the MFP 300 as described in FIG. 12. The MFP 300 then uses that information to execute settings related to IEEE 802.1X/EAP authentication. In step S903, the MFP 300 connects to a network which is configured by the access point 400 and in which IEEE 802.1X/EAP authentication is enabled. In other words, the MFP 300 establishes connection with an access point in which IEEE 802.1X/EAP authorization is enabled. In step S903, the communication apparatuses are connected to a network which is configured by the access point 400 and in which IEEE 802.1X/EAP authentication is enabled (e.g., in which the authentication server 500 is used), as illustrated in the FIG. 10A, and can communicate via the access point 400.

Figure 12A:
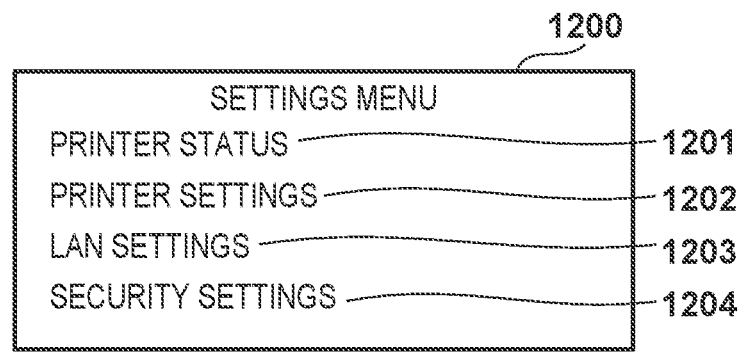
FIGS. 12A to 12G are diagrams illustrating the screen transitions in the information processing apparatus.

FIGS. 12A to 12G are diagrams illustrating screen transitions in the information processing apparatus 200. FIG. 12A illustrates an example of a screen for settings of the MFP 300 to be displayed on the information processing apparatus 200. A screen 1200 of FIG. 12A is displayed when a web browser or an application program (hereinafter referred to as an application) operating in the information processing apparatus 200 communicates with an HTTP server operating in the MFP 300. For example, "printer state" 1201, "printer settings" 1202, "LAN settings" 1203, and "security settings" 1204 are displayed on the screen 1200. The screen 1200 illustrated in FIG. 12A may be displayed by executing a standby response to an HTTP request in USB communication by the USB communication control unit 320 of the MFP 300.

Figure 12B:
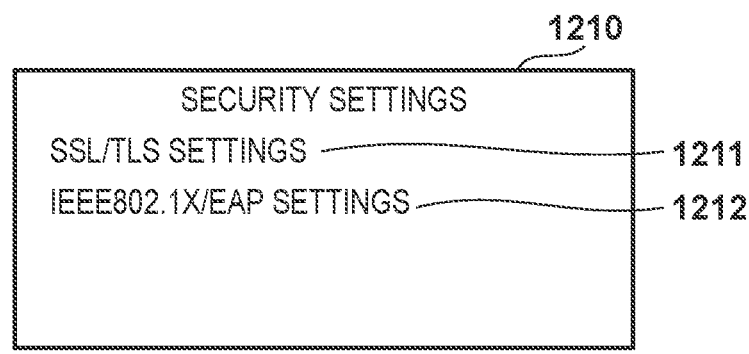

When "security settings" 1204 is selected in the screen 1200 of FIG. 12A, a screen 1210 illustrated in FIG. 12B is displayed. For example, "SSL/TLS settings" 1211 and "IEEE 802.1X/EAP settings" 1212 are displayed on the screen 1210. When "IEEE 802.1X/EAP settings" 1212 is selected in the screen 1210 of FIG. 12B, a screen 1220 illustrated in FIG. 12C is displayed.

Figure 12C:
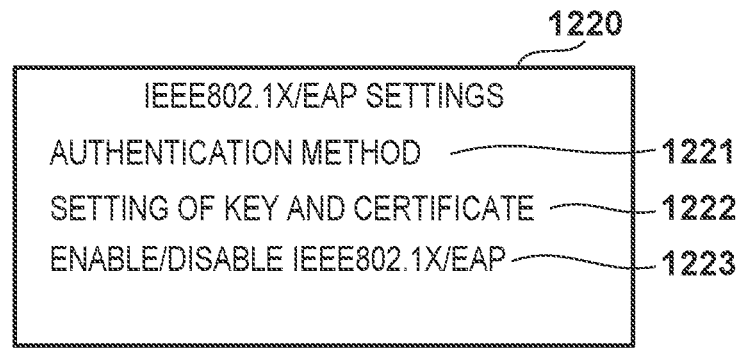
Figure 12D:
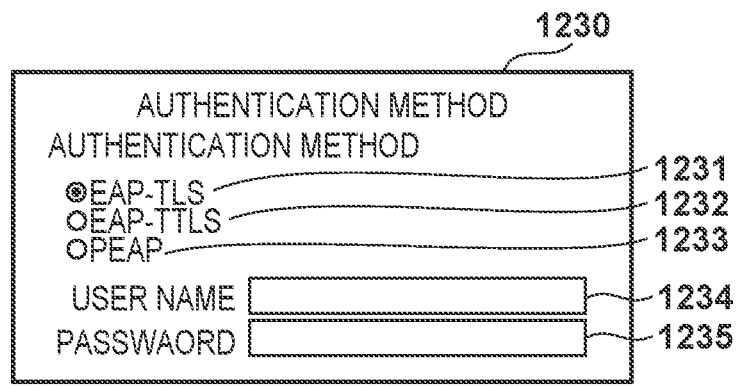

When "authentication method" 1221 is selected in the screen 1220 of FIG. 12C, a screen 1230 illustrated in FIG. 12D is displayed. By either "EAP-TLS" 1231, "EAP-TTLS" 1232, or "PEAP" 1233 being selected in the screen 1230 of FIG. 12D, an authentication method to be used at the time of IEEE 802.1X/EAP authentication is set in the MFP 300. In addition, by a login name being inputted in "username" 1234 and a password being inputted in "password" 1235 in the screen 1230 of FIG. 12D, the login name and the password to be used at the time of IEEE 802.1X/EAP authentication are set in the MFP 300.

Figure 12E:
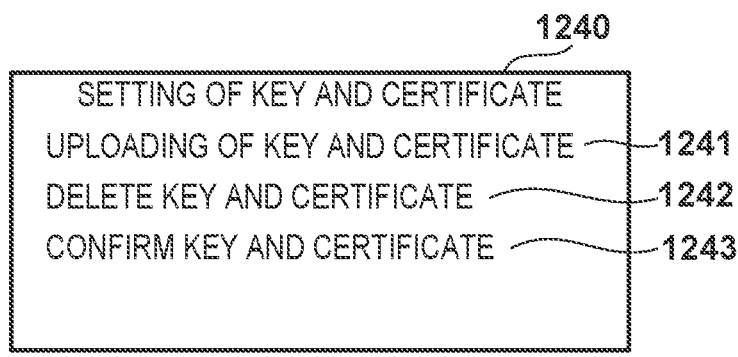
Figure 12F:
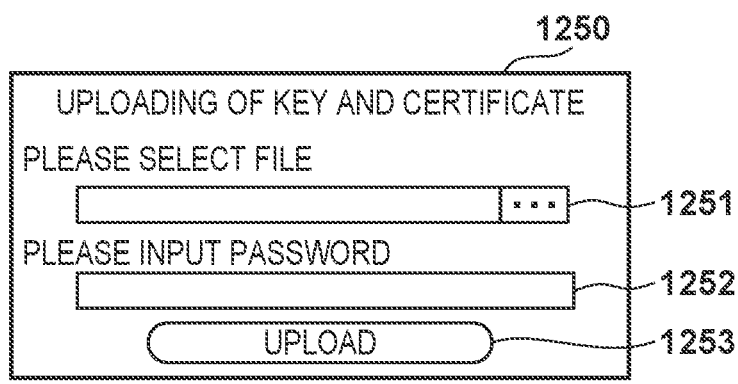

By the user selecting "set key and certificate" 1222 on the screen 1220 of FIG. 12C and selecting "upload key and certificate" 1241 in a screen 1240 of FIG. 12E, a screen 1250 of FIG. 12F is displayed. In the screen 1250, the user can register a certificate to be used at the time of IEEE 802.1X/EAP authentication in the MFP 300. By the user selecting a file in "select file" 1251 in the screen 1250 of FIG. 12F, a certificate to be used at the time of IEEE 802.1X/EAP authentication is selected. Then, by the user inputting a password in "password" 1252 on the screen 1250 and selecting "upload" 1253, a certificate and a password to be used at the time of IEEE 802.1X/EAP authentication is set in the MFP 300.

By the user selecting "delete key and certificate" 1242 in the screen 1240 of FIG. 12E, it is possible to delete a certificate stored in the MFP 300. By the user selecting "confirm key and certificate" 1243 in the screen 1240 of FIG. 12E, it is possible to display a list of certificates stored in the MFP 300.

Figure 12G:
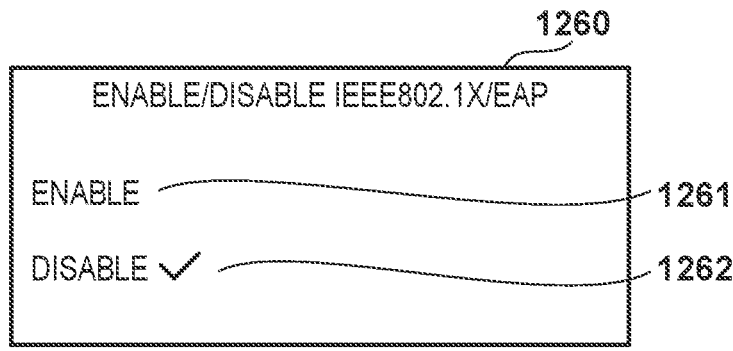

When the user selects "enable/disable IEEE 802.1X/EAP" 1223 in the screen 1220 of FIG. 12C, a screen 1260 illustrated in FIG. 12G is displayed. In the screen 1260 of FIG. 12G, the user can set IEEE 802.1X/EAP of the MFP 300 to enabled or disabled using "enable" 1261 or "disable" 1262.

By the above-described user operations, the user can set authentication information to be used in IEEE 802.1X/EAP authentication in the MFP 300. The MFP 300 can be connected to a network which is configured by the access point 400 and in which the authentication server 500 is used by being authenticated by the authentication server 500, using the set authentication information. In the present embodiment, regarding connection according to each mode, each state is managed as enabled (an on state)/disabled (an off state). For example, in the MFP 300, it is possible to perform switching of enabled connections and communication control by controlling the wireless communication unit 307 and the wired communication unit 321.

Next, setting information for authenticated connection and setting information for unauthenticated connection stored in the MFP 300 will be described. In the present embodiment, setting information that can be changed by a particular user whose authorization for changing the setting information is higher than that of another user is called the setting information for authenticated connection. In the present embodiment, the setting information for authenticated connection is information related to settings used for communication between the MFP 300 and an access point after the MFP 300 has been connected to an access point in which IEEE 802.1X/EAP authentication is enabled and authentication has been completed. The particular user is, for example, a network administrator. The setting information for authenticated connection can be changed only by the administrator and cannot be changed by a user who is not the administrator. Meanwhile, setting information that can be changed by both a user who is the administrator and a user who is not the administrator is called the setting information for unauthenticated connection. In the present embodiment, the setting information for unauthenticated connection is information related to settings used for communication between the MFP 300 and an access point after the MFP 300 has connected to an access point in which IEEE 802.1X/EAP authentication is not used and authentication according to the Personal method has been completed. In the present embodiment, the setting information for authenticated connection and the setting information for unauthenticated connection are each stored separately in a storage region. Also, when each piece of the information is changed, each piece of the changed information is stored separately in the storage region.

FIG. 16 is a diagram illustrating an example of a configuration of a memory in which setting information for authenticated connection 1601 and setting information for unauthenticated connection 1602 are stored. FIG. 16 illustrates a state in which the setting information for authenticated connection 1601 and the setting information for unauthenticated connection 1602 are stored in a storage region 1600 in the data memory 314.

Items 1603 and 1606 indicate setting items of setting information. The item 1603 indicates a method of obtaining an IPV4 address, and the item 1606 indicates a method of obtaining an IPV6 address. Setting information 1604 indicates that the setting information for authenticated connection for the item 1603 is "DHCP". In addition, setting information 1605 indicates that the setting information for unauthenticated connection for the item 1603 is "manually set". Setting information 1607 indicates that the setting information for authenticated connection for the item 1606 is "DHCPv6". In addition, setting information 1608 indicates that the setting information for unauthenticated connection for the item 1606 is "disabled".

As illustrated in FIG. 16, in the present embodiment, the setting information for authenticated connection 1601 and the setting information for unauthenticated connection 1602 are separately held in a storage region in the data memory 314, and as will be described later, which of these is used is determined based on whether the MFP 300 is connected to a network in which IEEE 802.1X/EAP authentication is enabled.

The setting information for authenticated connection 1601 and the setting information for unauthenticated connection 1602 are not limited to the example illustrated in FIG. 16. A setting item may be an arbitrary setting item different from the method of obtaining IPv4 address and the method of obtaining an IPV6 address. In the present embodiment, the method of obtaining an IPV4 address and the method of obtaining an IPV6 address are described as examples of a setting item.

Figure 13A:
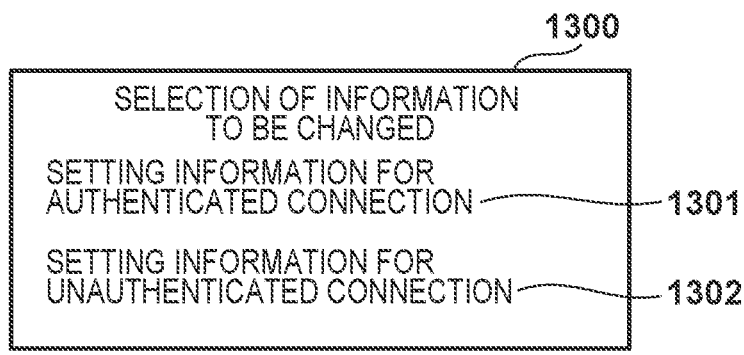
FIGS. 13A to 13G are diagrams illustrating screens in which setting information can be changed.

FIGS. 13A to 13G are diagrams illustrating examples of a screen in which setting information can be changed. A screen 1300 illustrated in FIG. 13A is displayed when "detailed settings" 1114 is selected on the screen 1110 of FIG. 11B and is a screen for selecting information to be changed. In the screen 1300, "setting information for authenticated connection" 1301 and "setting information for unauthenticated connection" 1302 are displayed.

Figure 13B:
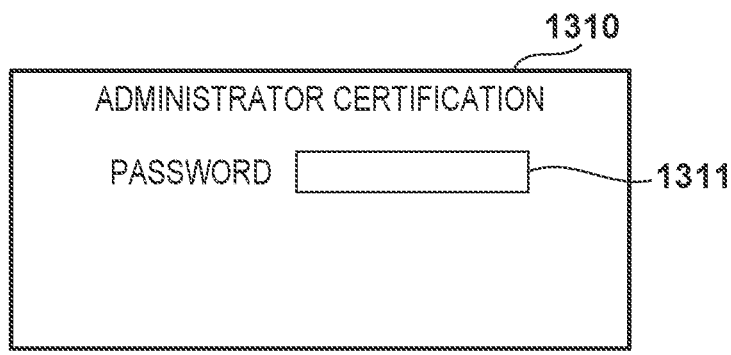

A screen 1310 illustrated in FIG. 13B is a screen that is displayed when "setting information for authenticated connection" 1301 is selected in the screen 1300 of FIG. 13A. The screen 1310 is a screen for authenticating whether a user currently operating the screen is the administrator. In the screen 1310, a password input field 1311 is displayed. By a password for the administrator being inputted in the password input field 1311, authentication is performed as to whether a user performing an operation is the administrator.

Figure 13C:
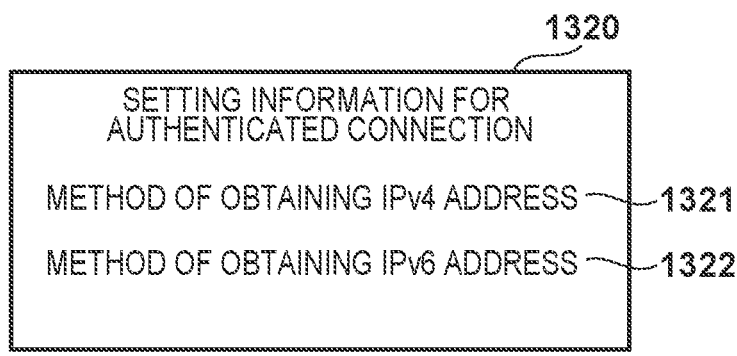

A screen 1320 illustrated in FIG. 13C is a screen that is displayed when the user currently operating the screen is authenticated as the administrator in the screen 1310 illustrated in FIG. 13B. The screen 1320 is a screen for selecting setting information to be changed in setting information to be used when the MFP 300 is connected to a network in which IEEE 802.1X/EAP authentication is enabled. In the screen 1320, an item 1321, "method of obtaining IPv4 address", and an item 1322, "method of obtaining IPv6 address", are displayed.

Figure 13D:
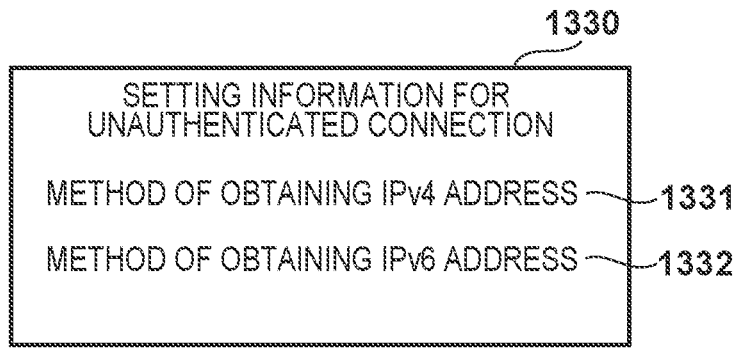

A screen 1330 illustrated in FIG. 13D is a screen that is displayed when "setting information for unauthenticated connection" 1302 is selected in the screen 1300 illustrated in FIG. 13A. The screen 1330 is a screen for selecting setting information to be changed in setting information to be used when the MFP 300 is not connected to a network in which IEEE 802.1X/EAP authentication is enabled. In the screen 1330, an item 1331, "method of obtaining IPv4 address", and an item 1332, "method of obtaining IPv6 address", are displayed.

Figure 13E:
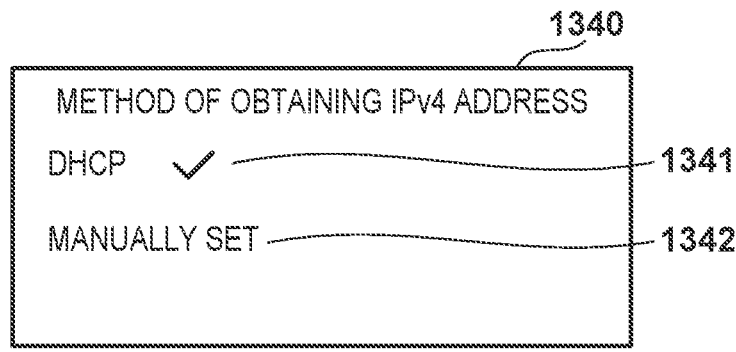

When "method of obtaining IPv4 address" is selected in the screen 1320 illustrated in FIG. 13C or "method of obtaining IPv4 address" is selected in the screen 1330 illustrated in FIG. 13D, a screen 1340 illustrated in FIG. 13E is displayed. That is, in a case of transition from the screen 1320, it is possible to change a setting of the method of obtaining an IPV4 address to be used when the MFP 300 is connected to a network in which IEEE 802.1X/EAP authentication is enabled. In addition, in a case of transition from the screen 1330, it is possible to change a setting of the method of obtaining an IPV4 address to be used when the MFP 300 is not connected to a network in which IEEE 802.1X/EAP authentication is enabled. In the screen 1340, an item 1341, "DHCP", and an item 1342, "manually set", are displayed.

When the item 1341 is selected after a transition from the screen 1320, "DHCP" is stored in the data memory 314 as the setting information 1604 of FIG. 16. In that case, when the MFP 300 is connected to a network in which IEEE 802.1X/EAP authentication is enabled, an address obtained by DHCP is used as an IPv4 address. When the item 1341 is selected after a transition from the screen 1330, "DHCP" is stored in the data memory 314 as the setting information 1605 of FIG. 16. In that case, when the MFP 300 is not connected to a network in which IEEE 802.1X/EAP authentication is enabled, an address obtained by DHCP is used as an IPv4 address.

Figure 13F:
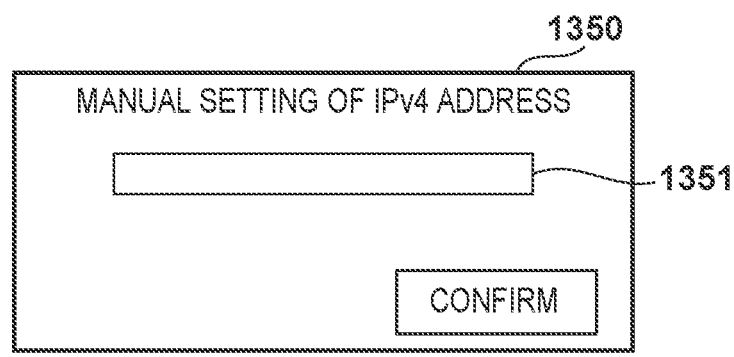

A screen 1350 illustrated in FIG. 13F is displayed when the item 1342, "manually set", is selected in the screen 1340 illustrated in FIG. 13E. The screen 1350 is a screen in which an IPV4 address can be manually set. In the screen 1350, a manual address input field 1351 is displayed. While the method of obtaining an IPv4 address is set to "manually set", an address inputted in the manual address input field 1351 is used as the IPV4 address. When the item 1342 is selected after a transition from the screen 1320, "manually set" is stored in the data memory 314 as the setting information 1604 of FIG. 16. When the item 1342 is selected after a transition from the screen 1330, "manually set" is stored in the data memory 314 as the setting information 1605 of FIG. 16.

Figure 13G:
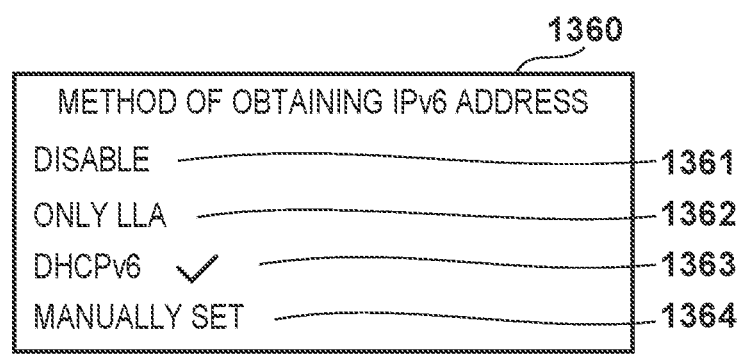

When the item 1322, "method of obtaining IPv6 address", is selected in the screen 1320 illustrated in FIG. 13C or the item 1332, "method of obtaining IPv6 address", is selected in the screen 1330 illustrated in FIG. 13D, a screen 1360 illustrated in FIG. 13G is displayed. That is, in a case of transition from the screen 1320, it is possible to change a setting of the method of obtaining an IPV6 address to be used when the MFP 300 is connected to a network in which IEEE 802.1X/EAP authentication is enabled. In addition, in a case of transition from the screen 1330, it is possible to change a setting of the method of obtaining an IPv6 address to be used when the MFP 300 is not connected to a network in which IEEE 802.1X/EAP authentication is enabled. In the screen 1360, an item 1361, "disabled"; an item 1362, "link-local address (LLA) only"; an item 1363, "DHCPv6"; and an item 1364, "manually set" are displayed.

When each of the items 1361 to 1364 is selected after a transition from the screen 1320, each piece of the above-described setting information is stored in the setting information 1607 of FIG. 16. When "disabled" is selected, an IPV6 address is not used when the MFP 300 is connected to a network in which IEEE 802.1X/EAP authentication is enabled. When "LLA only" is selected, only a link-local address is used as an IPV6 address when the MFP 300 is connected to a network in which IEEE 802.1X/EAP authentication is enabled. When "DHCPv6" is selected, both a link-local address and an address obtained by DHCPv6 are used as IPv6 addresses when the MFP 300 is connected to a network in which IEEE 802.1X/EAP authentication is enabled. When "manually set" is selected, both a link-local address and an address inputted by the user are used as IPv6 addresses when the MFP 300 is connected to a network in which IEEE 802.1X/EAP authentication is enabled.

When each of the items 1361 to 1364 is selected after a transition from the screen 1330, each piece of the above-described setting information is stored in the setting information 1608 of FIG. 16. When "disabled" is selected, an IPV6 address is not used when the MFP 300 is not connected to a network in which IEEE 802.1X/EAP authentication is enabled. When "LLA only" is selected, only a link-local address is used as an IPV6 address when the MFP 300 is not connected to a network in which IEEE 802.1X/EAP authentication is enabled. When "DHCPv6" is selected, both a link-local address and an address obtained by DHCPv6 are used as IPv6 addresses when the MFP 300 is not connected to a network in which IEEE 802.1X/EAP authentication is enabled. When "manually set" is selected, both a link-local address and an address inputted by the user are used as IPv6 addresses when the MFP 300 is not connected to a network in which IEEE 802.1X/EAP authentication is enabled.

The following describes processing for when the setting information for authenticated connection 1601 changed by the administrator is applied to an actual operation of the MFP 300.

FIG. 14 is a flowchart for explaining processing for when the setting information for authenticated connection 1601 is changed. The processing of FIG. 14 is realized, for example, by the CPU 311 reading out and executing a program stored in the program memory 313.

In step S1401, the CPU 311 changes the setting information for authenticated connection 1601 stored in the data memory 314 to setting information inputted via the screens of FIGS. 13E and 13F or the screen of FIG. 13G. For example, "method of obtaining IPv4 address" 1603 or "method of obtaining IPv6 address" 1606 is changed to setting information inputted by the administrator. There may be an item for another setting information. For example, "method of obtaining IPv4 address" 1603 is changed to either piece of setting information: the item 1341, "DHCP", or the item 1342, "manual setting", of FIG. 13E. Also, "method of obtaining IPv6 address" 1606, for example, is changed to one of pieces of setting information: the item 1361, "disabled (IPv6 address is not used)"; the item 1362, "use only the link-local address"; the item 1363, "obtain according to DHCPv6"; and the item 1364 "manually set" of FIG. 13G.

In step S1402, the CPU 311 determines whether the IEEE 802.1X/EAP setting is enabled. The determination in step S1402 is, for example, determined based on the setting information inputted via the screen of FIG. 11I displayed in the MFP 300. When it is determined to be enabled, the processing proceeds to step S1403. Meanwhile, when it is determined to be disabled, the processing of FIG. 14 is ended. That is, in that case, even if the setting information for authenticated connection 1601 is changed, content of the change is not applied to actual operation.

In step S1403, the CPU 311 determines whether a state is such that the MFP 300 is connected to a network which is established by the access point 400 and IEEE 802.1X/EAP authentication is enabled. When it is determined that the MFP 300 is connected, the processing proceeds to step S1404. Meanwhile, when it is determined that the MFP 300 is not connected, the processing of FIG. 14 is ended. That is, in that case, even if the setting information for authenticated connection 1601 is changed, content of the change is not applied to actual operation. Whether connection has been established may be determined, for example, based on whether a packet indicating successful authentication has been received from the access point 400.

In step S1404, the CPU 311 applies the setting information for authenticated connection 1601 changed in step S1401 to actual operation. For example, an IPv4 address and an IPV6 address is obtained based on the setting information set for "method of obtaining IPv4 address" 1603 and "method of obtaining IPv6 address" 1606.

As described above, according to the present embodiment, the setting information for authenticated connection 1601 changed by the administrator is applied to actual operation on a condition that the MFP 300 is connected to a network in which IEEE 802.1X/EAP authentication is enabled, in other words, that authentication has been completed. Meanwhile, when the IEEE 802.1X/EAP setting is disabled, or when the MFP 300 is not connected to a network in which IEEE 802.1X/EAP authentication is enabled, the setting information for authenticated connection 1601 changed by the administrator is not applied to actual operation of the MFP 300. Therefore, it is possible to prevent a case such as that in which the use of a communication apparatus by a user who is not the administrator is restricted by the setting information changed by the administrator. The setting information for authenticated connection 1601 changed by the administrator is maintained as it is stored in the data memory 314.

The following describes processing for when the setting information for unauthenticated connection 1602 changed by the administrator or a user who is not the administrator is applied to actual operation of the MFP 300.

FIG. 15 is a flowchart for explaining processing for when the setting information for unauthenticated connection 1602 is changed. The processing of FIG. 15 is realized, for example, by the CPU 311 reading out and executing a program stored in the program memory 313.

In step S1501, the CPU 311 changes the setting information for unauthenticated connection 1602 stored in the data memory 314 to setting information inputted via the screens of FIGS. 13E and 13F or the screen of FIG. 13G. For example, "method of obtaining IPv4 address" 1603 or "method of obtaining IPv6 address" 1606 is changed to setting information inputted by the administrator. There may be an item for other setting information. For example, "method of obtaining IPv4 address" 1603 is changed to either piece of setting information: the item 1341, "DHCP", or the item 1342, "manual setting", of FIG. 13E. Also, "method of obtaining IPv6 address" 1606, for example, is changed to one of the pieces of the setting information: the item 1361, "disabled (IPv6 address is not used)"; the item 1362, "use only the link-local address"; the item 1363, "obtain according to DHCPv6"; and the item 1364 "manually set" of FIG. 13G.

In step S1502, the CPU 311 determines whether the IEEE 802.1X/EAP setting is enabled. The determination in step S1502 is, for example, determined based on the setting information inputted via the screen of FIG. 11I displayed in the MFP 300. When it is determined to be enabled, the processing proceeds to step S1503. Meanwhile, when it is determined to be disabled, the processing proceeds to step S1504.

In step S1503, the CPU 311 determines whether a state is such that the MFP 300 is connected to a network which is established by the access point 400 and IEEE 802.1X/EAP authentication is enabled. When it is determined that the MFP 300 is connected, the processing of FIG. 15 is ended. That is, in that case, even if the setting information for unauthenticated connection 1602 is changed, content of the change is not applied to actual operation. Meanwhile, when it is determined that the MFP 300 is not connected, the processing proceeds to step S1504. Whether connection has been established may be determined, for example, based on whether a packet indicating successful authentication has been received from the access point 400.

In step S1504, the CPU 311 applies the setting information for unauthenticated connection 1602 changed in step S1501 to actual operation. For example, an IPv4 address and an IPV6 address is obtained based on the setting information set for "method of obtaining IPv4 address" 1603 and "method of obtaining IPv6 address" 1606.

As described above, according to the present embodiment, when the MFP 300 is connected to a network in which IEEE 802.1X/EAP authentication is enabled, the changed setting information for unauthenticated connection 1602 is not applied to an actual operation of the MFP 300. Therefore, the setting information inputted by the administrator for that network is maintained. Meanwhile, when the IEEE 802.1X/EAP setting is disabled, or when the MFP 300 is not connected to a network in which IEEE 802.1X/EAP authentication is enabled, the changed setting information for unauthenticated connection 1602 is applied to actual operation. It is possible to prevent a case such as that in which the use of a communication apparatus by a user who is not the administrator is restricted by the setting information changed by the administrator.

The following describes processing for determining setting information to be applied when the MFP 300 is started.

Figure 17:
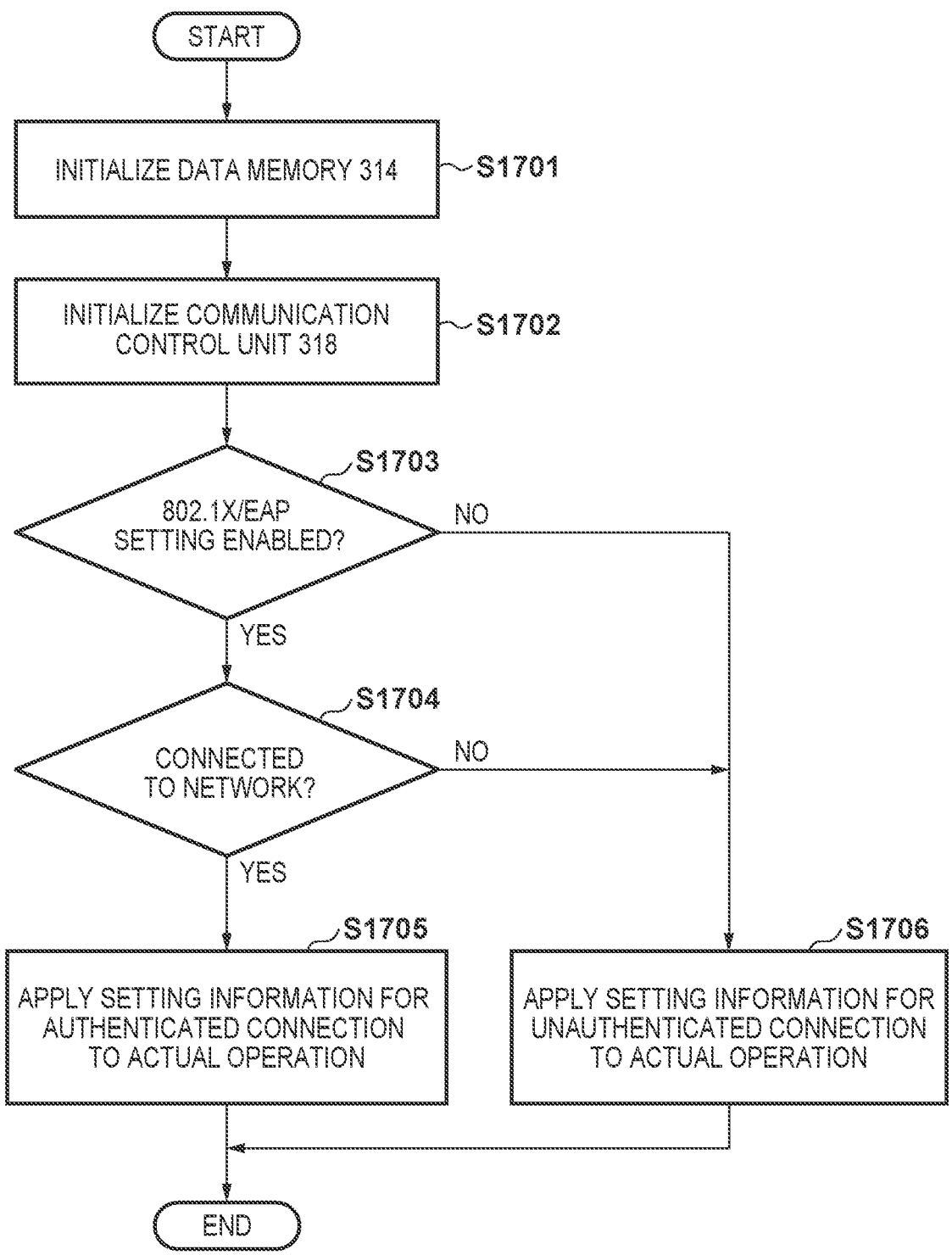
FIG. 17 is a flowchart for explaining processing at startup of the MFP.

FIG. 17 is a flowchart for explaining processing for determining setting information to be applied when the MFP 300 is started. This is realized, for example, by the CPU 311 reading out and executing a program stored in the program memory 313. The processing of FIG. 17 is started when the MFP 300 is started.

In step S1701, the CPU 311 initializes the data memory 314. However, at that time, stored content is set to be maintained for the setting information for authenticated connection 1601 and the setting information for unauthenticated connection 1602 of FIG. 16. In step S1702, the CPU 311 initializes the communication control unit 318.

In step S1703, the CPU 311 determines whether the IEEE 802.1X/EAP setting is enabled. The determination in step S1703 is, for example, made based on the setting information inputted via the screen of FIG. 11I displayed in the MFP 300. When the IEEE 802.1X/EAP setting is determined to be enabled, the processing proceeds to step S1704. Meanwhile, when it is determined to be disabled, the processing proceeds to step S1706.

In step S1704, the CPU 311 determines whether a state is such that the MFP 300 is connected to a network which is established by the access point 400 and IEEE 802.1X/EAP authentication is enabled. When it is determined that the MFP 300 is connected, the processing proceeds to step S1705. Meanwhile, when it is determined that the MFP 300 is not connected, the processing proceeds to step S1706. Whether connection has been established may be determined, for example, based on whether a packet indicating successful authentication has been received from the access point 400.

In step S1705, the CPU 311 applies the setting information for authenticated connection 1601 to an actual operation of the MFP 300. Meanwhile, in step S1706, the CPU 311 applies the setting information for unauthenticated connection 1602 to actual operation of the MFP 300.

As described above, according to the present embodiment, when the MFP 300 is started, when the IEEE 802.1X/EAP setting is enabled and the MFP 300 is connected to a network in which IEEE 802.1X/EAP authentication is enabled, the setting information for authenticated connection 1601 is applied to actual operation. At that time, for example, when the setting information for authenticated connection 1601 is changed in step S1401 of FIG. 14, that changed information is applied to actual operation. The setting information for unauthenticated connection 1602 is stored in another storage region of the data memory 314 and can be changed by the user. Meanwhile, when the MFP 300 is started, when the IEEE 802.1X/EAP setting is disabled or even if the IEEE 802.1X/EAP setting is enabled, the MFP 300 is not connected to a network in which IEEE 802.1X/EAP authentication is enabled, the setting information for unauthenticated connection 1602 is applied to actual operation. At that time, for example, when the setting information for unauthenticated connection 1602 is changed in step S1501 of FIG. 15, that changed information is applied to actual operation. The setting information for authenticated connection 1601 is stored in another storage region of the data memory 314 and can be changed by the administrator.

As described above, it is possible to maintain the setting information for authenticated connection 1601 set by the administrator and prevent the use of a communication apparatus by a user who is not the administrator from being restricted by the settings by the administrator.

In FIG. 17, the processing for determining setting information to be applied when the MFP 300 is started has been described. In FIG. 18, setting information to be applied when authentication information is changed by the administrator is determined. In the present embodiment, assume that 802.1X authentication information can be changed only by the administrator. For example, when there is an item "change authentication information" in the screen 1130 of FIG. 11, when that item is selected, the administrator authentication screen in which a username and a password can be inputted is displayed. When a predetermined username and password are inputted and authenticated, a screen for changing authentication information as illustrated in FIG. 19 is displayed, thereby allowing the administrator to change the authentication information.

FIG. 18 is a flowchart for explaining processing for determining setting information to be applied when 802.1X authentication information is changed. This is realized, for example, by the CPU 311 reading out and executing a program stored in the program memory 313.

In step S1801, the CPU 311 changes 802.1X authentication information based on input via the screen for changing authentication information of FIG. 19.

In step S1802, the CPU 311 determines whether the IEEE 802.1X/EAP setting is enabled. The determination in step S1802 is, for example, made based on the setting information inputted via the screen of FIG. 11I displayed in the MFP 300. When the IEEE 802.1X/EAP setting is determined to be enabled, the processing proceeds to step S1803. Meanwhile, when it is determined to be disabled, the processing proceeds to step $1805.

In step S1803, the CPU 311 determines whether a state is such that the MFP 300 is connected to a network which is established by the access point 400 and IEEE 802.1X/EAP authentication is enabled. When it is determined that the MFP 300 is connected, the processing proceeds to step S1804. Meanwhile, when it is determined that the MFP 300 is not connected, the processing proceeds to step S1805. Whether connection has been established may be determined, for example, based on whether a packet indicating successful authentication has been received from the access point 400.

In step S1804, the CPU 311 applies the setting information for authenticated connection 1601 to an actual operation of the MFP 300. Meanwhile, in step S1805, the CPU 311 applies the setting information for unauthenticated connection 1602 to an actual operation of the MFP 300.

As described above, according to the present embodiment, the setting information for authenticated connection 1601 is applied to actual operation on a condition that the MFP 300 is connected to a network in which IEEE 802.1X/EAP authentication is enabled, in other words, that authentication has been completed. Therefore, the setting information inputted by the administrator is maintained. As illustrated in FIG. 18, even when the authentication information is changed by the administrator, when authentication has not been completed, the setting information for unauthenticated connection 1602 is applied to actual operation. Therefore, it is possible to prevent a case such as that in which the use of a communication apparatus by a user who is not the administrator is restricted by the setting information changed by the administrator.

Figure 20:
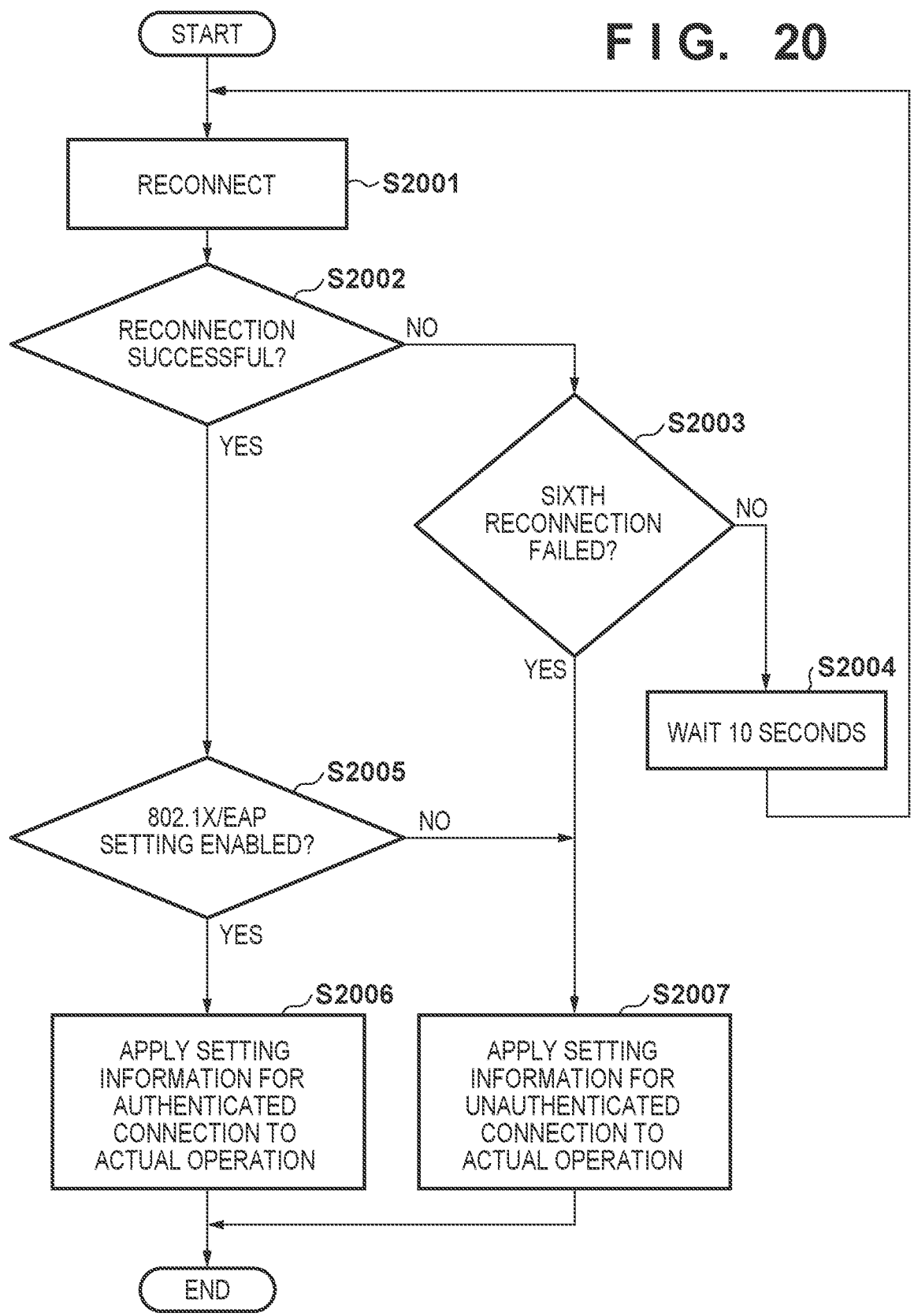
FIG. 20 is a flowchart for explaining processing to be executed when the MFP is disconnected from a network.

FIG. 20 is a flowchart for explaining processing to be performed when the MFP 300 connected to a network wirelessly or by wire is disconnected from the network. This is realized, for example, by the CPU 311 reading out and executing a program stored in the program memory 313. The processing of FIG. 20 is executed when the wireless communication unit 307 detects disconnection of wireless connection or when the wired communication unit 320 detects that a cable is disconnected.

In step S2001, the CPU 311 attempts to reconnect to a network for which disconnection has been detected.

In step S2002, the CPU 311 determines whether reconnection is successful. When it is determined that reconnection is successful, the processing proceeds to step S2005. Meanwhile, when reconnection fails, the processing proceeds to step S2003.

In step S2003, the CPU 311 determines whether the number of reconnections that have repeatedly failed is six or more. When it is determined to six or more, the processing proceeds to step S2007. A threshold to be used in the determination is not limited to six, and an arbitrary number such as one or 10, may be set. Meanwhile, when it is determined to be less than six, the processing proceeds to step S2004.

In step S2004, the CPU 311 waits 10 seconds.

In step S2005, the CPU 311 determines whether the IEEE 802.1X/EAP setting is enabled. The determination in step S2005 is, for example, determined based on the setting information inputted via the screen of FIG. 11I displayed in the MFP 300. When the IEEE 802.1X/EAP setting is determined to be enabled, the processing proceeds to step S2006. Meanwhile, when it is determined to be disabled, the processing proceeds to step S2007.

In step S2006, the CPU 311 applies the setting information for authenticated connection 1601 to an actual operation of the MFP 300. Then, an attempt is made to reconnect to the network using the setting information for authenticated connection 1601. At this time, reconnection need not be attempted, and configuration may be such that only application of the setting information for authenticated connection 1601 is executed. Meanwhile, in step S2007, the CPU 311 applies the setting information for unauthenticated connection 1602 to actual operation of the MFP 300. Then, an attempt is made to reconnect to the network using the setting information for unauthenticated connection 1602. At this time, reconnection need not be attempted, and configuration may be such that only application of the setting information for unauthenticated connection 1602 is executed.

For example, assume that in a state in which the MFP 300 is connected to a network in which IEEE 802.1X/EAP authentication is enabled (i.e., a network in which the setting information for authenticated connection 1601 is used), the MFP 300 becomes disconnected from the network, and reconnection to the network fails multiple times. In that case, YES is determined in step S2003, and the setting information for unauthenticated connection 1602 is applied to actual operation. Thereby, the MFP 300 connects to a network in which IEEE 802.1X/EAP authentication is not used (i.e., a network in which the setting information for unauthenticated connection 1602 is used). Such processing makes it possible to prevent a case such as that in which the use of a communication apparatus by a user who is not the administrator is restricted by the setting information changed by the administrator.

In the above-described form, in order to allow only the administrator to change the setting information for authenticated connection 1601, authentication is performed as to whether a user performing an operation is the administrator. At this time, specifically, authentication as to whether the user performing an operation is the administrator has been performed by acceptance of a password inputted to the screen 1310 displayed after "setting information for authenticated connection" 1301 has been selected on the screen 1300. However, the present invention is not limited to this form. For example, authentication may be performed as to whether a user is the administrator in a manner other than the inputting of a password in the screen 1310. Specifically, for example, authentication as to whether the user is the administrator may be performed by an IC card reader provided in the MFP 300 reading an IC card held by the administrator and obtaining of information corresponding to the administrator from the IC card. Also, the timing at which authentication as to whether the user is the administrator is performed is not limited to after "setting information for authenticated connection" 1301 has been selected on the screen 1300. Authentication as to whether the user performing an operation is the administrator may be performed at an arbitrary timing before "setting information for authenticated connection" 1301 is selected on the screen 1300. When "setting information for authenticated connection" 1301 is selected on the screen 1300 in a state in which the user performing an operation has been authenticated as the administrator, the screen 1320 may be displayed without the screen 1310 being displayed.

Further, in the above, information that can be changed only by the administrator is information related to settings used for communication between the MFP 300 and the access point after IEEE 802.1X/EAP authentication has been completed; however, the present invention is not limited to this form. Specifically, for example, information related to settings used for IEEE 802.1X/EAP authentication may be treated as information that can be changed only by the administrator. More specifically, for example, information to be changed by input in FIGS. 12C to 12G may be treated as information that can be changed only by the administrator. In that case, for example, when "IEEE 802.1X/EAP settings" 1212 of FIG. 12B is selected, authentication is performed as to whether the user performing an operation is the administrator. Both the information related to the settings used for communication between the MFP 300 and the access point after IEEE 802.1X/EAP authentication has been completed and the information related to the settings used for IEEE 802.1X/EAP authentication may be treated as information that can be changed only by the administrator.

Further, a form may be taken such that only the administrator can execute an operation for connecting the MFP 300 and an access point in which IEEE 802.1X/EAP authentication is used; an operation for changing from a state in which the MFP 300 is connected to an access point in which Personal method authentication is used to a state in which the MFP 300 is connected to an access point in which IEEE 802.1X/EAP authentication is used; and the like. That is, for example, a form may be taken such that only the administrator can execute input in FIG. 11D. In that case, for example, when "802.1X/EAP settings" 1122 of FIG. 11C is selected, authentication as to whether the user performing an operation is the administrator is performed. For example, a form may be taken such that while the MFP 300 is connected to an access point in which IEEE 802.1X/EAP authentication is used, only the administrator can execute input after "wireless LAN setup" 1112 has been selected. In that case, for example, a form may be taken such that when "wireless LAN setup" 1112 is selected while the MFP 300 is connected to an access point in which IEEE 802.1X/EAP authentication is used, authentication as to whether the user performing an operation is the administrator is performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-068469, filed Apr. 18, 2022, which is hereby incorporated by reference herein in its entirety.

What is claimed is:

1. A printing apparatus having a display unit, the printing apparatus comprising:
at least one memory and at least one processor which function as:
a first accepting unit configured to accept an operation for changing setting information related to a first authentication which is an authentication in accordance with an IEEE802.1X/EAP authentication method;
a first display control unit configured to display, on the display unit, an input screen for accepting an input of a password based on the operation for changing the setting information related to the first authentication being accepted;
a second display control unit configured to, in a case where the password is input on the input screen, display, on the display unit, a screen for changing the setting information related to the first authentication;
a second accepting unit configured to accept an operation for changing setting information related to a second authentication which is an authentication in accordance with an authentication method different from the IEEE802.1X/EAP authentication method;
a third display control unit configured to display, on the display unit, a screen for changing the setting information related to the second authentication, without displaying the input screen, based on the operation for changing the setting information related to the second authentication being accepted;
an establishment unit configured to establish a connection between an access point and the printing apparatus;
a control unit configured to, in a case where the first authentication is used in a communication in which the connection is used, cause the printing apparatus to operate using the setting information related to the first authentication, and in a case where the second authentication is used in a communication in which the connection is used, cause the printing apparatus to operate using the setting information related to the second authentication, and
a print unit configured to perform printing based on print data received from the information processing apparatus via the access point.

2. The printing apparatus according to claim 1, wherein the authentication method different from the IEEE802.1X/EAP authentication method is an authentication method in which an authentication server is not used.

3. The printing apparatus according to claim 1, wherein the authentication method different from the IEEE802.1X/EAP authentication method is at least one of a PSK method using Pre Shared key, and a SAE method using Simultaneous Authentication of Equals.

4. The printing apparatus according to claim 1, wherein the at least one processor is configured to further function as a fourth display control unit configured to display, on the display unit, a screen including a region for accepting the operation for changing the setting information related to the first authentication, and a region for accepting the operation for changing the setting information related to the second authentication.

5. The printing apparatus according to claim 1, wherein the connection corresponding to the first authentication between the access point and the printing apparatus is a connection by a wireless LAN.

6. The printing apparatus according to claim 1, wherein the connection corresponding to the first authentication between the access point and the printing apparatus is a connection by a wired LAN.

7. The printing apparatus according to claim 1, wherein the setting information related to the first authentication is setting information which is changeable by a first user and is not changeable by a second user whose authorization for changing setting information related to a network is lower than that of the first user, and
the setting information related to the second authentication is setting information which is changeable by the second user.

8. The printing apparatus according to claim 1, wherein even if the setting information related to the second authentication is changed, the changed setting information related to the second authentication is not used if the connection based on the first authentication is established.

9. The printing apparatus according to claim 1, wherein even if the setting information related to the first authentication is changed, the changed setting information related to the first authentication is not used if the connection based on the second authentication is established.

10. The printing apparatus according to claim 1, wherein the at least one processor is configured to further function as a determination unit configured to determine whether the first authentication is performed or not by a communication between the access point and the printing apparatus in a case where the printing apparatus is activated,
wherein in a case where it is determined that the first authentication is performed, the control unit causes the printing apparatus to operate using the setting information related to the first authentication.

11. The printing apparatus according to claim 1, wherein in a case where the connection corresponding to the first authentication between the access point and the printing apparatus is disconnected and reestablishment processing for reestablishing a connection corresponding to the first authentication between the access point and the printing apparatus fails, the control unit causes the printing apparatus to operate using the setting information related to the second authentication.

12. The printing apparatus according to claim 11, wherein in a case where the reestablishment processing fails a number of times which is equal to or more than a threshold, the control unit causes the printing apparatus to operate using the setting information related to the second authentication.

13. The printing apparatus according to claim 1, wherein the screen for changing the setting information related to the first authentication includes at least one of a region for changing a method of obtaining an IPV4 address and a region for changing a method of obtaining an IPV6 address.

14. The printing apparatus according to claim 1, wherein the screen for changing the setting information related to the second authentication includes at least one of a region for changing a method of obtaining an IPV4 address and a region for changing a method of obtaining an IPV6 address.

15. The printing apparatus according to claim 1, wherein the at least one processor is configured to further function as a fifth display control unit configured to display, on the display unit, a screen different from the input screen, for accepting an input of a password used for the first authentication.

16. The printing apparatus according to claim 15, wherein the screen for accepting the input of the password used for the first authentication is configured to further accept an input of a login name used for the first authentication.

17. A method for controlling a printing apparatus having a display unit, the method comprising:
   accepting an operation for changing setting information related to a first authentication which is an authentication in accordance with an IEEE802.1X/EAP authentication method;
   displaying, on the display unit, an input screen for accepting an input of a password based on the operation for changing the setting information related to the first authentication being accepted;
   in a case where the password is input on the input screen, displaying, on the display unit, a screen for changing the setting information related to the first authentication;
   accepting an operation for changing setting information related to a second authentication which is an authentication in accordance with an authentication method different form the IEEE802.1X/EAP authentication method;
   displaying, on the display unit, a screen for changing the setting information related to the second authentication, without displaying the input screen, based on the operation for changing the setting information related to the second authentication being accepted;
   establishing a connection between an access point and the printing apparatus;
   in a case where the first authentication is used in a communication in which the connection is used, causing the printing apparatus to operate using the setting information related to the first authentication, and in a case where the second authentication is used in a communication in which the connection is used, causing the printing apparatus to operate using the setting information related to the second authentication, and
   performing printing based on print data received from the information processing apparatus via the access point.

18. A non-transitory computer readable storage medium storing a program configured to cause a computer to function to:
   accept an operation for changing setting information related to a first authentication which is an authentication in accordance with an IEEE802.1X/EAP authentication method;
   display, on the display unit, an input screen for accepting an input of a password based on the operation for changing the setting information related to the first authentication being accepted;
   in a case where the password is input on the input screen, displaying, on the display unit, a screen for changing the setting information related to the first authentication;
   accept an operation for changing setting information related to a second authentication which is an authentication in accordance with an authentication method different form the IEEE802.1X/EAP authentication method;
   display, on the display unit, a screen for changing the setting information related to the second authentication, without displaying the input screen, based on the operation for changing the setting information related to the second authentication being accepted;
   establish a connection between an access point and the printing apparatus;
   in a case where the first authentication is used in a communication in which the connection is used, cause the printing apparatus to operate using the setting information related to the first authentication, and in a case where the second authentication is used in a communication in which the connection is used, cause the printing apparatus to operate using the setting information related to the second authentication, and
   perform printing based on print data received from the information processing apparatus via the access point.

* * * * *